United States Patent
Xiong et al.

(10) Patent No.: US 10,958,386 B2
(45) Date of Patent: Mar. 23, 2021

(54) ACK/NACK SIGNALS FOR NEXT GENERATION LTE DEVICES AND SYSTEMS

(71) Applicant: Apple Inc., Cupertino, CA (US)

(72) Inventors: Gang Xiong, Beaverton, OR (US); Huaning Niu, Milpitas, CA (US); Hooman Shirani-Mehr, Portland, OR (US); Yushu Zhang, Beijing (CN); Yuan Zhu, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/408,223

(22) Filed: May 9, 2019

(65) Prior Publication Data

US 2019/0372723 A1    Dec. 5, 2019

Related U.S. Application Data

(63) Continuation of application No. 15/574,681, filed as application No. PCT/US2015/066655 on Dec. 18, 2015, now Pat. No. 10,560,229.
(Continued)

(51) Int. Cl.
*H04L 1/18* (2006.01)
*H04L 5/00* (2006.01)
(Continued)

(52) U.S. Cl.
CPC .............. *H04L 1/1861* (2013.01); *H04L 1/18* (2013.01); *H04L 5/0055* (2013.01);
(Continued)

(58) Field of Classification Search
CPC ... H04L 1/1861; H04L 1/1887; H04L 1/1893; H04L 1/1896; H04L 5/0055
See application file for complete search history.

(56) References Cited

U.S. PATENT DOCUMENTS 9,955,462 B2    4/2018 Chen et al.
2010/0208679 A1    8/2010 Papasakellariou et al.
(Continued)

FOREIGN PATENT DOCUMENTS

CN    102237928 A    11/2011
CN    103889060 A    6/2014
(Continued)

OTHER PUBLICATIONS

"U.S. Appl. No. 15/574,681, Final Office Action dated Jun. 18, 2019", 13 pgs.
(Continued)

*Primary Examiner* — Pao Sinkantarakorn
(74) *Attorney, Agent, or Firm* — Kowert, Hood, Munyon, Rankin & Goetzel, P.C.

(57) ABSTRACT

Devices and methods of providing symmetric UL and DL ACK/NACKs is generally described. UL ACK/NACKs of different UEs are multiplexed and received by a UE with a PUSCH. The receiving UE in response transmits the DL ACK/NACK. The ACK/NACK may be transmitted in a localized or distributed manner among subbands that may be adjacent or each may have blocks separated by blocks of a different subband. The ACK and NACK may use independent resources or the NACK may not be transmitted on the single ACK/NACK resource, the lack of an ACK serving as a NACK. The ACK/NACK may be transmitted using a beamforming weight shaped by the received PUSCH/PDSCH. The ACK/NACK symbol may be located in the first symbol, adjacent to the PUSCH/PDSCH, or at the end of a TTI. If adjacent, the UL grant or UL assignment may indicate whether the ACK/NACK resource is used by the PUSCH/PDSCH.

20 Claims, 10 Drawing Sheets

Related U.S. Application Data

(60) Provisional application No. 62/180,971, filed on Jun. 17, 2015.

(51) Int. Cl.
*H04W 72/04* (2009.01)
*H04L 27/20* (2006.01)

(52) U.S. Cl.
CPC ....... *H04L 5/0091* (2013.01); *H04W 72/0453* (2013.01); *H04L 5/0048* (2013.01); *H04L 27/206* (2013.01); *H04L 27/2035* (2013.01)

(56) References Cited

U.S. PATENT DOCUMENTS

| | | |
|---|---|---|
| 2012/0033587 A1 | 2/2012 | Papasakellariou et al. |
| 2012/0250663 A1 | 10/2012 | Han et al. |
| 2013/0100900 A1 | 4/2013 | Lee et al. |
| 2013/0148613 A1* | 6/2013 | Han ............... H04L 5/0055 370/329 |
| 2013/0195041 A1 | 8/2013 | Papasakellariou et al. |
| 2014/0105191 A1 | 4/2014 | Yang et al. |
| 2014/0198731 A1* | 7/2014 | Khoshnevis ........ H04L 5/0094 370/329 |
| 2015/0124671 A1 | 5/2015 | Tabet et al. |
| 2015/0156768 A1 | 6/2015 | Guan et al. |
| 2016/0112181 A1 | 4/2016 | Tabet et al. |
| 2018/0139014 A1 | 5/2018 | Xiong et al. |

FOREIGN PATENT DOCUMENTS

| | | |
|---|---|---|
| CN | 107078864 A | 8/2017 |
| CN | 107637000 A | 1/2018 |
| WO | WO-2016204811 A1 | 12/2016 |

OTHER PUBLICATIONS

"U.S. Appl. No. 15/574,681, Non Final Office Action dated Feb. 15, 2019", 15 pgs.
"U.S. Appl. No. 15/574,681, Response filed Apr. 25, 2019 to Non Final Office Action dated Feb. 15, 2019", 15 pgs.
"European Application Serial No. 15895849.6, Extended European Search Report dated Apr. 24, 2019", 16 pgs.
"European Application Serial No. 15895849.6, Partial Supplementary European Search Report dated Jan. 15, 2019", 20 pgs.
"International Application Serial No. PCT/US2015/066655, International Preliminary Report on Patentability dated Dec. 28, 2017", 11 pgs.
"International Application Serial No. PCT/US2015/066655, International Search Report dated Apr. 20, 2016", 4 pgs.
"International Application Serial No. PCT/US2015/066655, Written Opinion dated Apr. 20, 2016", 9 pgs.
Nokia, et al., "FDD HARQ Issues over Un with 8ms SF Periodicity", 3gpp Draft; R1-100346 Harq Over Un Interface 8ms, 3rd Generation Partnership Project (3GPP), Mobile Competence Centre ; 650, Route Des Lucioles ; F-06921 Sophia-Antipolis Cedex ; France, vol. RAN WG1, No. Valencia, Spain, (Jan. 12, 2010), 6 pgs.
Office Action in Chinese Application No. 2015800801784, dated Jun. 30, 2020, with English Patent Search Report, 12 pgs.

* cited by examiner

ACK/NACK SIGNALS FOR NEXT GENERATION LTE DEVICES AND SYSTEMS

PRIORITY CLAIM

This application is a continuation of U.S. patent application Ser. No. 15/574,681, filed Nov. 16, 2017, which is a U.S. National Stage Filing under 35 U.S.C. 371 from International Application No. PCT/US2015/066655, filed Dec. 18, 2015 and published in English as WO 2016/204811 on Dec. 22, 2016, which claims the benefit of priority to U.S. Provisional Patent Application Ser. No. 62/180,971, filed Jun. 17, 2015, and entitled "PHYSICAL LAYER DETAILS ON ACK/NACK CHANNEL DESIGN FOR 5G SYSTEM," each of which is incorporated herein by reference in their entirety.

TECHNICAL FIELD

Embodiments pertain to radio access networks. Some embodiments relate to providing acknowledgment of a transmission in cellular networks, including Third Generation Partnership Project Long Term Evolution (3GPP LTE) networks and LTE advanced (LTE-A) networks as well as $4^{th}$ generation (4G) networks and $5^{th}$ generation (5G) networks

BACKGROUND

With the increase in different types of devices communicating over networks to servers and other computing devices, usage of 3GPP LTE systems has increased. In particular, as the number and complexity of UEs has grown, the demand for an increased amount and variety of services has grown. Next generation systems may be targeted to meet vastly different and sometime conflicting performance constraints driven by these different services. In designing next generation 5G systems, certain aspects of LTE communications may be modified to account for the increased number of devices. In particular, among the various control signals, it may be desirable to provide flexibility for Hybrid ARQ (HARQ) acknowledgements/negative acknowledgements (ACK/NACK) in next generation networks.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION OF THE INVENTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
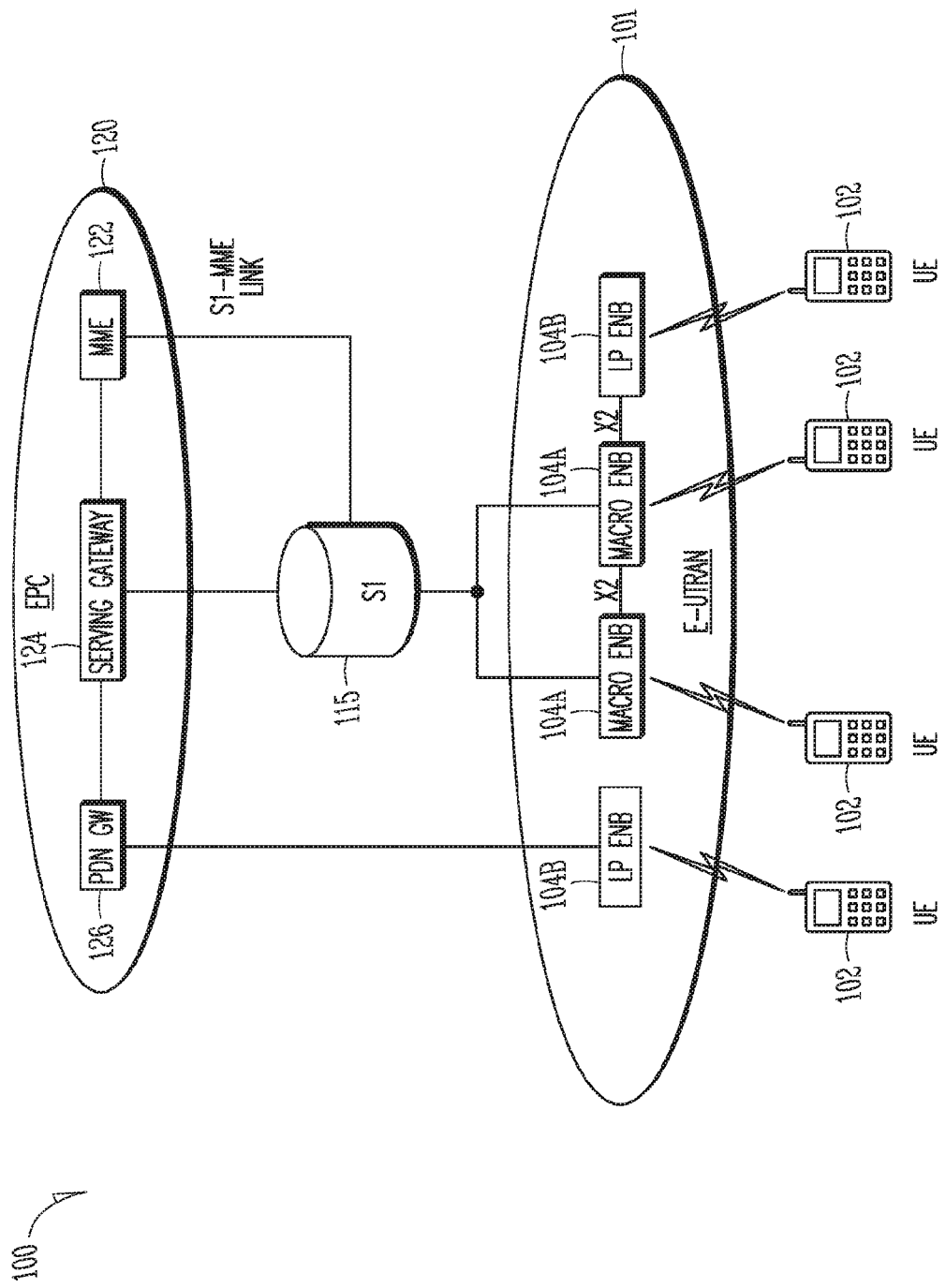
FIG. 1 is a functional diagram of a wireless network in accordance with some embodiments.

FIG. 1 shows an example of a portion of an end-to-end network architecture of a Long Term Evolution (LTE) network with various components of the network in accordance with some embodiments. As used herein, an LTE network refers to both LTE and LTE Advanced (LTE-A) networks as well as other versions of LTE networks to be developed. The network 100 may comprise a radio access network (RAN) (e.g., as depicted, the E-UTRAN or evolved universal terrestrial radio access network) 101 and core network 120 (e.g., shown as an evolved packet core (EPC)) coupled together through an S1 interface 115. For convenience and brevity, only a portion of the core network 120, as well as the RAN 101, is shown in the example.

The core network 120 may include a mobility management entity (MME) 122, serving gateway (serving GW) 124, and packet data network gateway (PDN GW) 126. The RAN 101 may include evolved node Bs (eNBs) 104 (which may operate as base stations) for communicating with user equipment (UE) 102. The eNBs 104 may include macro eNBs 104a and low power (LP) eNBs 104b. The eNBs 104 and UEs 102 may employ the synchronization techniques as described herein.

The MME 122 may be similar in function to the control plane of legacy Serving GPRS Support Nodes (SGSN). The MME 122 may manage mobility aspects in access such as gateway selection and tracking area list management. The serving GW 124 may terminate the interface toward the RAN 101, and route data packets between the RAN 101 and the core network 120. In addition, the serving GW 124 may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes.

The PDN GW 126 may terminate a SGi interface toward the packet data network (PDN). The PDN GW 126 may route data packets between the EPC 120 and the external PDN, and may perform policy enforcement and charging data collection. The PDN GW 126 may also provide an anchor point for mobility devices with non-LTE access. The external PDN can be any kind of IP network, as well as an IP Multimedia Subsystem (IMS) domain. The PDN GW 126 and the serving GW 124 may be implemented in a single physical node or separate physical nodes.

The eNBs 104 (macro and micro) may terminate the air interface protocol and may be the first point of contact for a UE 102. In some embodiments, an eNB 104 may fulfill various logical functions for the RAN 101 including, but not limited to, RNC (radio network controller functions) such as radio bearer management, uplink and downlink dynamic radio resource management and data packet scheduling, and mobility management. In accordance with embodiments, UEs 102 may be configured to communicate orthogonal frequency division multiplexed (OFDM) communication signals with an eNB 104 over a multicarrier communication channel in accordance with an OFDMA communication technique. The OFDM signals may comprise a plurality of orthogonal subcarriers.

The S1 interface 115 may be the interface that separates the RAN 101 and the EPC 120. It may be split into two parts: the S1-U, which may carry traffic data between the eNBs 104 and the serving GW 124, and the S1-MME, which may be a signaling interface between the eNBs 104 and the MME 122. The X2 interface may be the interface between eNBs 104. The X2 interface may comprise two parts, the X2-C and X2-U. The X2-C may be the control plane interface between the eNBs 104, while the X2-U may be the user plane interface between the eNBs 104.

With cellular networks, LP cells 104b may be typically used to extend coverage to indoor areas where outdoor signals do not reach well, or to add network capacity in areas with dense usage. In particular, it may be desirable to enhance the coverage of a wireless communication system using cells of different sizes, macrocells, microcells, picocells, and femtocells, to boost system performance. The cells of different sizes may operate on the same frequency band, or may operate on different frequency bands with each cell operating in a different frequency band or only cells of different sizes operating on different frequency bands. As used herein, the term LP eNB refers to any suitable relatively LP eNB for implementing a smaller cell (smaller than a macro cell) such as a femtocell, a picocell, or a microcell. Femtocell eNBs may be typically provided by a mobile network operator to its residential or enterprise customers. A femtocell may be typically the size of a residential gateway or smaller and generally connect to a broadband line. The femtocell may connect to the mobile operator's mobile network and provide extra coverage in a range of typically 30 to 50 meters. Thus, a LP eNB 104b might be a femtocell eNB since it is coupled through the PDN GW 126. Similarly, a picocell may be a wireless communication system typically covering a small area, such as in-building (offices, shopping malls, train stations, etc.), or more recently in-aircraft. A picocell eNB may generally connect through the X2 link to another eNB such as a macro eNB through its base station controller (BSC) functionality. Thus, LP eNB may be implemented with a picocell eNB since it may be coupled to a macro eNB 104a via an X2 interface. Picocell eNBs or other LP eNBs LP eNB 104b may incorporate some or all functionality of a macro eNB LP eNB 104a. In some cases, this may be referred to as an access point base station or enterprise femtocell.

Communication over an LTE network may be split up into 10 ms frames, each of which may contain ten 1 ms subframes. Each subframe of the frame, in turn, may contain two slots of 0.5 ms. Each subframe may be used for uplink (UL) communications from the UE to the eNB or downlink (DL) communications from the eNB to the UE. In one embodiment, the eNB may allocate a greater number of DL communications than UL communications in a particular frame. The eNB may schedule transmissions over a variety of frequency bands ($f_1$ and $f_2$). The allocation of resources in subframes used in one frequency band and may differ from those in another frequency band. Each slot of the subframe may contain 6-7 OFDM symbols, depending on the system used. In one embodiment, the subframe may contain 12 subcarriers. A downlink resource grid may be used for downlink transmissions from an eNB to a UE, while an uplink resource grid may be used for uplink transmissions from a UE to an eNB or from a UE to another UE. The resource grid may be a time-frequency grid, which is the physical resource in the downlink in each slot. The smallest time-frequency unit in a resource grid may be denoted as a resource element (RE). Each column and each row of the resource grid may correspond to one OFDM symbol and one OFDM subcarrier, respectively. The resource grid may contain resource blocks (RBs) that describe the mapping of physical channels to resource elements and physical RBs (PRBs). A PRB may be the smallest unit of resources that can be allocated to a UE. A resource block may be 180 kHz wide in frequency and 1 slot long in time. In frequency, resource blocks may be either 12×15 kHz subcarriers or 24×7.5 kHz subcarriers wide. For most channels and signals, 12 subcarriers may be used per resource block, dependent on the system bandwidth. In Frequency Division Duplexed (FDD) mode, both the uplink and downlink frames may be 10 ms and frequency (full-duplex) or time (half-duplex) separated. In Time Division Duplexed (TDD), the uplink and downlink subframes may be transmitted on the same frequency and are multiplexed in the time domain. The duration of the resource grid 400 in the time domain corresponds to one subframe or two resource blocks. Each resource grid may comprise 12 (subcarriers)*14 (symbols) =168 resource elements.

Each OFDM symbol may contain a cyclic prefix (CP) which may be used to effectively eliminate Inter Symbol Interference (ISI), and a Fast Fourier Transform (FFT) period. The duration of the CP may be determined by the highest anticipated degree of delay spread. Although distortion from the preceding OFDM symbol may exist within the CP, with a CP of sufficient duration, preceding OFDM symbols do not enter the FFT period. Once the FFT period signal is received and digitized, the receiver may ignore the signal in the CP.

There may be several different physical downlink channels that are conveyed using such resource blocks, including the physical downlink control channel (PDCCH) and the physical downlink shared channel (PDSCH). Each subframe may be partitioned into the PDCCH and the PDSCH. The PDCCH may normally occupy the first two symbols of each subframe and carries, among other things, information about the transport format and resource allocations related to the PDSCH channel, as well as H-ARQ information related to the uplink shared channel. The PDSCH may carry user data and higher layer signaling to a UE and occupy the remainder of the subframe. Typically, downlink scheduling (assigning control and shared channel resource blocks to UEs within a cell) may be performed at the eNB based on channel quality information provided from the UEs to the eNB, and then the downlink resource assignment information may be sent to each UE on the PDCCH used for (assigned to) the UE. The PDCCH may contain downlink control information (DCI) in one of a number of formats that indicate to the UE how to find and decode data, transmitted on PDSCH in the same subframe, from the resource grid. The DCI format may provide details such as number of resource blocks, resource allocation type, modulation scheme, transport block, redundancy version, coding rate etc. Each DCI format may have a cyclic redundancy code (CRC) and be scrambled with a Radio Network Temporary Identifier (RNTI) that identifies the target UE for which the PDSCH is intended. Use of the UE-specific RNTI may limit decoding of the DCI format (and hence the corresponding PDSCH) to only the intended UE.

To enable retransmission of missing or erroneous data units, a Hybrid Automatic Repeat Request (HARQ) scheme may be used to provide the feedback on success or failure of the decoding attempt to the transmitter after each received data block. When the eNB 104 sends PDSCH data in a downlink transmission to the UE 102, the data packets may be sent together with indicators in a PDCCH in the same subframe that inform the UE 102 about the scheduling of the PDSCH, including the transmission time and other scheduling information of the transmitted data. For each PDSCH codeword that the UE 102 receives, the UE 102 may respond with an ACK when the codeword is successfully decoded, or a NACK when the codeword is not successfully decoded. The eNB may expect the ACK/NACK feedback after a predetermined number of subframes from the subframe in which the PDSCH data is sent. Upon receiving a NACK from the UE 102, the eNB may retransmit the transport block or skip the retransmission if the retransmission number exceeds a maximum value. The ACK/NACK for the corresponding the PDSCH may be transmitted by the UE 102 four subframes after the PDSCH is received from the eNB. Depending on the number of codewords present, HARQ-ACK information corresponding to a PDSCH may contain, for example, 1 or 2 information bits (DCI formats 1a and 1b, respectively). The HARQ-ACK bits may then be processed, as per the PUCCH.

The Physical Uplink Control Channel (PUCCH) may be used by the UE 102 to send Uplink Control Information (UCI) to the eNB 104. The PUCCH may be mapped to a UL control channel resource defined by an orthogonal cover code and two RBs, consecutive in time, with hopping potentially at the boundary between adjacent slots. The PUCCH may take several different formats, with the UCI containing information dependent on the format. Specifically, the PUCCH may contain a scheduling request (SR), acknowledgement responses/retransmission requests (ACK/NACK) or a Channel Quality Indication (CQI)/Channel State Information (CSI). The CQI/CSI may indicate to the eNB 104 an estimate of the current downlink channel conditions as seen by the UE 102 to aid channel-dependent scheduling and, if one MIMO transmission mode is configured to the UE 102, may include MIMO-related feedback (e.g. Precoder matrix indication, PMI). Uplink ACK/NACK feedback from the eNB 104 to the UE 102 may be provided in much the same manner as downlink the ACK/NACK feedback, using the PDCCH, instead of the PUCCH.

The Physical Hybrid-ARQ Indicator Channel (PHICH) may carry one or more HARQ ACK/NACKs for uplink communications. PHICHs may be located in the first OFDM symbol of each subframe. A PHICH may be carried by several Resource Element Groups (REGs). Multiple PHICHs can share the same set of REGs, differentiated by orthogonal covers. PHICHs that share the same resources are called a PHICH group. A specific PHICH may be identified by two parameters: the PHICH group number and the orthogonal sequence index within the group. In the time domain, if an uplink transmission occurs in subframe n, the corresponding PHICH may be in subframe n+4. In the frequency domain, the PHICH may be indicated by the uplink resource allocation with DCI format 0, where the specific PHICH may be able to be derived from the lowest uplink PRB index in the first slot of the corresponding PUSCH transmission and the Demodulation Reference Signal (DMRS) cyclic shift, as indicated in 3GPP TS 36.213 section 9.1.2. The DMRS may be used for channel estimation and coherent demodulation of the PUSCH and PUCCH. If the DMRS is bad or is not decoded properly by the eNB 104, the PUSCH or PUCCH will be not decoded. The position of the DMRS in the PUCCH may vary dependent on the PUCCH format indicator; the DMRS may be disposed in the center symbol of a slot (3rd symbol of slot 0 and 10th symbol of slot1) when in the PUSCH.

The channel coding for HARQ ACK/NACKs may use 3 bits: an ACK may be indicated by 111 and a NACK may be indicated by 000. PHICHs may use Binary Phase Shift Keying (BPSK) modulation, so 3 modulation symbols are generated for each ACK or NACK. The 3 modulation symbols may be multiplied by the orthogonal cover, which may have a spreading factor (SF) of 4 for a normal cyclic prefix (CP), resulting in a total of 12 symbols. Each REG may contain 4 REs and each RE can carry one modulation symbol, so 3 REGs are used for a single PHICH.

The REGs that support a PHICH group may be evenly distributed within the system bandwidth to provide frequency diversity. The Physical Control Format Indicator Channel (PCFICH) may also appear in the first symbol of each subframe, and occupy 4 REGs, evenly distributed across the system bandwidth, regardless of system bandwidth.

In some embodiments, a PHICH group may be able to carry up to 8 PHICHs as a total of 8 orthogonal sequences have been defined in 3GPP TS 36.211 Table 6.9.1-2. At least some of the information (the downlink bandwidth and the parameter (Ng)) used to determine the number of PHICHs in a PHICH group may be signaled using the master information block (MIB). The number of supported PHICH groups may be determined based on the network configuration as indicated in TS 3GPP TS 36.211 section 6.9. For example, given a downlink channel bandwidth of 10 MHz and Ng=1, there will be a total of 7 PHICH groups available, the total number of PHICHs supported per subframe is 7 PHICH groups×8 PHICHs per PHICH group=56 PHICHs, and the total number of REs used is 7 PHICH groups×3 REGs per PHICH group×4 REs per REG=84 REs.

A scheduling request (SR) may permit the UE to request uplink resources for Physical Uplink Shared Channel (PUSCH). In some embodiments, no information bits are transmitted by the UE to request uplink resources to transmit PUSCH. The eNB may know, however, the timing of when to expect a scheduling request from each UE within the cell as the resources used for SR transmission for a given UE is assigned by eNB, occurring every several subframes. Thus, if PUCCH energy is detected, the eNB may identify it as a scheduling request from the corresponding UE. PUCCH formats 1, 1a, and 1b may use four SC-FDMA symbols of seven OFDM symbols per slot to transmit HARQ-ACK information bits using a normal CP and may be modulated respectfully using BPSK and quadrature phase shift keying (QPSK). If a normal CP is used, the remaining 3 symbols may be used for a PUCCH demodulation reference signal (DM-RS). If a sounding reference signal (SRS) overlaps the PUCCH symbols, only three symbols of the seven OFDM symbols may be used for HARQ-ACK information bits transmission in the second slot of the subframe. DM-RS symbols may be used by the eNB to perform channel estimation and allow for coherent demodulation of the received signal. The DM-RS symbols may be essentially pilot symbols in LTE, used for channel estimation for the demodulation of the data symbols of the subframe.

Periodic reference signaling messages containing reference signals may occur between the eNB and the UEs. The downlink reference signals may include cell-specific reference signal (CRS) and UE-specific reference signals. The CRS may be used for scheduling transmissions to multiple UEs, channel estimation, coherent demodulation at the UE and handover. Other reference signals may include a channel state information reference signal (CSI-RS) used for measurement purposes, and a Discovery Reference Signal (DRS) specific to an individual UE. CSI-RS are relatively sparse, occur in the PDSCH and are antenna dependent.

The Primary Synchronization Signal (PSS) and Secondary Synchronization Signal (SSS) may be used by the UE to identify the cell using the cell ID, the current subframe number, slot boundary, and duplexing mode. The PSS and SSS may be sent in the center 6 PRBs (1.08 MHz) of the system bandwidth used by the eNB $104a$, $104b$. The PSS and SSS may be transmitted from the eNB $104a$, $104b$ in a broadcast to all UEs 102 in symbol periods 6 and 5, respectively, in each of subframes 0 and 5 of each radio frame with a normal CP. As the location of the PSS may be a constant, the PSS may permit UEs 102 to synchronize to the network without any a priori knowledge of the allocated bandwidth. The PSS may be comprised of a sequence of length 62 symbols, mapped to the central 62 subcarriers around the Direct Current (D.C.) subcarrier. The PSS may be constructed from a frequency-domain Zadoff-Chu (ZC) sequence of length 63. The UE 102 may be able to obtain the physical layer cell ID and achieve slot synchronization after the detection of the PSS. The PSS and SSS may be comprised of a sequence length of 62 symbols, mapped to the central 62 subcarriers around the direct current (DC) subcarrier. The SSS sequences may be generated according to maximum length sequences (M-sequences), which can be created by cycling through every possible state of a shift register of length n. Detection of the PSS and SSS may enable time and frequency synchronization, provide the UE with the physical layer identity of the cell and the CP length, and inform the UE whether the cell uses FDD or TDD.

The above and other periodic messages thus not only provide information regarding the communication channel, but also enable tracking in time and/or frequency of communications with the UE. The uplink reference signals may include Demodulation Reference Signals (DM-RS), which may be used to enable coherent signal demodulation at the eNB. DM-RS may be time multiplexed with uplink data and transmitted on the fourth or third symbol of an uplink slot for normal or extended CP, respectively, using the same bandwidth as the data. Sounding Reference Signals (SRS) may be used by UEs with different transmission bandwidth to allow channel dependent uplink scheduling and may typically be transmitted in the last symbol of a subframe.

Figure 2:
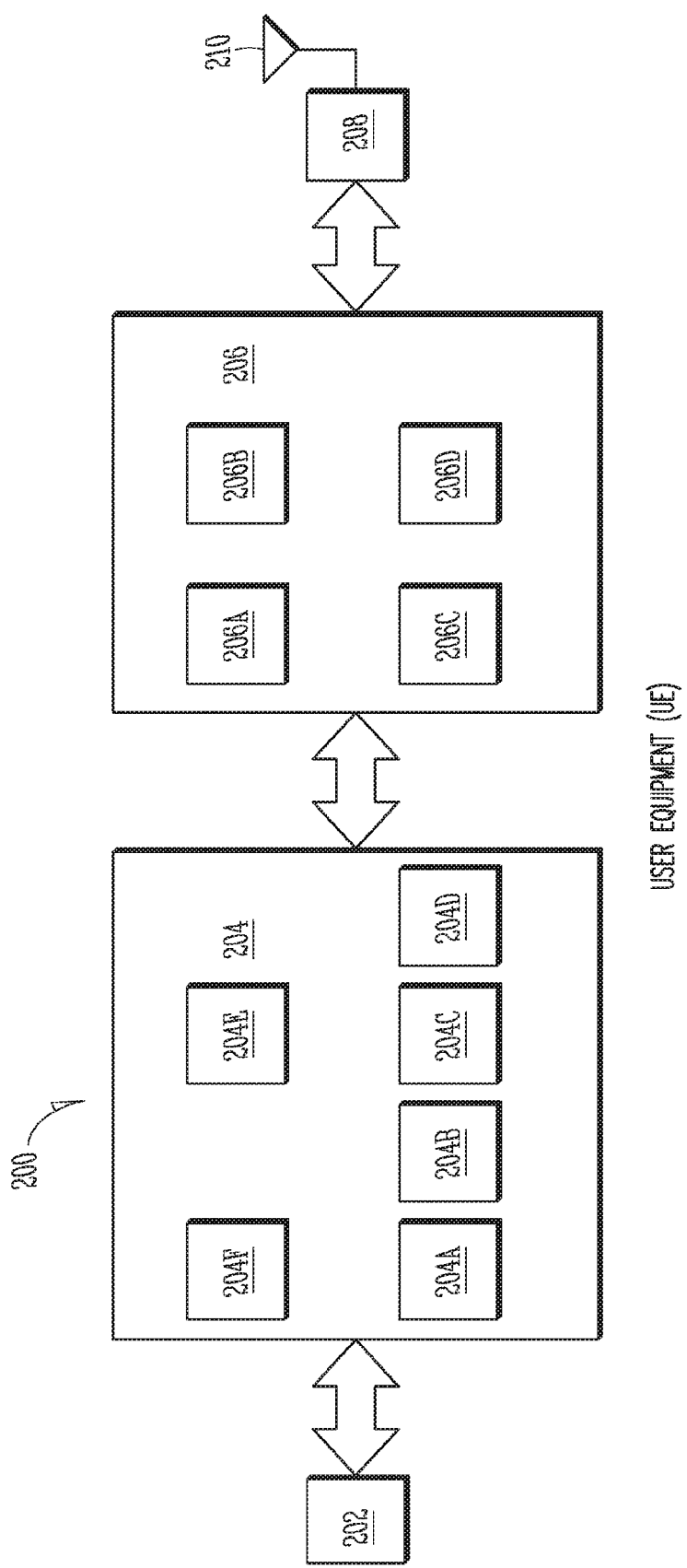
FIG. 2 illustrates components of a communication device in accordance with some embodiments.

Embodiments described herein may be implemented into a system using any suitably configured hardware and/or software. FIG. 2 illustrates components of a UE in accordance with some embodiments. At least some of the components shown may be used in an eNB or MME, for example, such as the UE 102 or eNB 104 shown in FIG. 1. The UE 200 and other components may be configured to use the synchronization signals as described herein. The UE 200 may be one of the UEs 102 shown in FIG. 1 and may be a stationary, non-mobile device or may be a mobile device. In some embodiments, the UE 200 may include application circuitry 202, baseband circuitry 204, Radio Frequency (RF) circuitry 206, front-end module (FEM) circuitry 208 and one or more antennas 210, coupled together at least as shown. At least some of the baseband circuitry 204, RF circuitry 206, and FEM circuitry 208 may form a transceiver. In some embodiments, other network elements, such as the eNB may contain some or all of the components shown in FIG. 2. Other of the network elements, such as the MME, may contain an interface, such as the S1 interface, to communicate with the eNB over a wired connection regarding the UE.

The application or processing circuitry 202 may include one or more application processors. For example, the application circuitry 202 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 204 may include circuitry such as, but not limited to, one or more single-core or multi-core processors. The baseband circuitry 204 may include one or more baseband processors and/or control logic to process baseband signals received from a receive signal path of the RF circuitry 206 and to generate baseband signals for a transmit signal path of the RF circuitry 206. Baseband processing circuitry 204 may interface with the application circuitry 202 for generation and processing of the baseband signals and for controlling operations of the RF circuitry 206. For example, in some embodiments, the baseband circuitry 204 may include a second generation (2G) baseband processor $204a$, third generation (3G) baseband processor $204b$, fourth generation (4G) baseband processor $204c$, and/or other baseband processor(s) $204d$ for other existing generations, generations in development or to be developed in the future (e.g., fifth generation (5G), 6G, etc.). The baseband circuitry 204 (e.g., one or more of baseband processors $204a$-$d$) may handle various radio control functions that enable communication with one or more radio networks via the RF circuitry 206. The radio control functions may include, but are not limited to, signal modulation/demodulation, encoding/decoding, radio frequency shifting, etc. In some embodiments, modulation/demodulation circuitry of the baseband circuitry 204 may include FFT, precoding, and/or constellation mapping/demapping functionality. In some embodiments, encoding/decoding circuitry of the baseband circuitry 204 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 204 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) $204e$ of the baseband circuitry 204 may be configured to run elements of the protocol stack for signaling of the PHY, MAC, RLC, PDCP and/or RRC layers. In some embodiments, the baseband circuitry may include one or more audio digital signal processor(s) (DSP) 204f. The audio DSP(s) 204f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 204 and the application circuitry 202 may be implemented together such as, for example, on a system on a chip (SOC).

In some embodiments, the baseband circuitry 204 may provide for communication compatible with one or more radio technologies. For example, in some embodiments, the baseband circuitry 204 may support communication with an evolved universal terrestrial radio access network (EU-TRAN) and/or other wireless metropolitan area networks (WMAN), a wireless local area network (WLAN), a wireless personal area network (WPAN). Embodiments in which the baseband circuitry 204 is configured to support radio communications of more than one wireless protocol may be referred to as multi-mode baseband circuitry. In some embodiments, the device can be configured to operate in accordance with communication standards or other protocols or standards, including Institute of Electrical and Electronic Engineers (IEEE) 802.16 wireless technology (WiMax), IEEE 802.11 wireless technology (WiFi) including IEEE 802 ad, which operates in the 60 GHz millimeter wave spectrum, various other wireless technologies such as global system for mobile communications (GSM), enhanced data rates for GSM evolution (EDGE), GSM EDGE radio access network (GERAN), universal mobile telecommunications system (UMTS), UMTS terrestrial radio access network (UTRAN), or other 2G, 3G, 4G, 5G, etc. technologies either already developed or to be developed.

RF circuitry 206 may enable communication with wireless networks using modulated electromagnetic radiation through a non-solid medium. In various embodiments, the RF circuitry 206 may include switches, filters, amplifiers, etc. to facilitate the communication with the wireless network. RF circuitry 206 may include a receive signal path which may include circuitry to down-convert RF signals received from the FEM circuitry 208 and provide baseband signals to the baseband circuitry 204. RF circuitry 206 may also include a transmit signal path which may include circuitry to up-convert baseband signals provided by the baseband circuitry 204 and provide RF output signals to the FEM circuitry 208 for transmission.

In some embodiments, the RF circuitry 206 may include a receive signal path and a transmit signal path. The receive signal path of the RF circuitry 206 may include mixer circuitry 206a, amplifier circuitry 206b and filter circuitry 206c. The transmit signal path of the RF circuitry 206 may include filter circuitry 206c and mixer circuitry 206a. RF circuitry 206 may also include synthesizer circuitry 206d for synthesizing a frequency for use by the mixer circuitry 206a of the receive signal path and the transmit signal path. In some embodiments, the mixer circuitry 206a of the receive signal path may be configured to down-convert RF signals received from the FEM circuitry 208 based on the synthesized frequency provided by synthesizer circuitry 206d. The amplifier circuitry 206b may be configured to amplify the down-converted signals and the filter circuitry 206c may be a low-pass filter (LPF) or band-pass filter (BPF) configured to remove unwanted signals from the down-converted signals to generate output baseband signals. Output baseband signals may be provided to the baseband circuitry 204 for further processing. In some embodiments, the output baseband signals may be zero-frequency baseband signals, although this is not a requirement. In some embodiments, mixer circuitry 206a of the receive signal path may comprise passive mixers, although the scope of the embodiments is not limited in this respect.

In some embodiments, the mixer circuitry 206a of the transmit signal path may be configured to up-convert input baseband signals based on the synthesized frequency provided by the synthesizer circuitry 206d to generate RF output signals for the FEM circuitry 208. The baseband signals may be provided by the baseband circuitry 204 and may be filtered by filter circuitry 206c. The filter circuitry 206c may include a low-pass filter (LPF), although the scope of the embodiments is not limited in this respect.

In some embodiments, the mixer circuitry 206a of the receive signal path and the mixer circuitry 206a of the transmit signal path may include two or more mixers and may be arranged for quadrature downconversion and/or upconversion respectively. In some embodiments, the mixer circuitry 206a of the receive signal path and the mixer circuitry 206a of the transmit signal path may include two or more mixers and may be arranged for image rejection (e.g., Hartley image rejection). In some embodiments, the mixer circuitry 206a of the receive signal path and the mixer circuitry 206a may be arranged for direct downconversion and/or direct upconversion, respectively. In some embodiments, the mixer circuitry 206a of the receive signal path and the mixer circuitry 206a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 206 may include analog-to-digital converter (ADC) and digital-to-analog converter (DAC) circuitry and the baseband circuitry 204 may include a digital baseband interface to communicate with the RF circuitry 206.

In some dual-mode embodiments, a separate radio IC circuitry may be provided for processing signals for each spectrum, although the scope of the embodiments is not limited in this respect.

In some embodiments, the synthesizer circuitry 206d may be a fractional-N synthesizer or a fractional N/N+1 synthesizer, although the scope of the embodiments is not limited in this respect as other types of frequency synthesizers may be suitable. For example, synthesizer circuitry 206d may be a delta-sigma synthesizer, a frequency multiplier, or a synthesizer comprising a phase-locked loop with a frequency divider.

The synthesizer circuitry 206d may be configured to synthesize an output frequency for use by the mixer circuitry 206a of the RF circuitry 206 based on a frequency input and a divider control input. In some embodiments, the synthesizer circuitry 206d may be a fractional N/N+1 synthesizer.

In some embodiments, frequency input may be provided by a voltage controlled oscillator (VCO), although that is not a requirement. Divider control input may be provided by either the baseband circuitry 204 or the applications processor 202 depending on the desired output frequency. In some embodiments, a divider control input (e.g., N) may be determined from a look-up table based on a channel indicated by the applications processor 202.

Synthesizer circuitry 206d of the RF circuitry 206 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 206*d* may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency ($f_{LO}$). In some embodiments, the RF circuitry 206 may include an IQ/polar converter.

FEM circuitry 208 may include a receive signal path which may include circuitry configured to operate on RF signals received from one or more antennas 210, amplify the received signals and provide the amplified versions of the received signals to the RF circuitry 206 for further processing. FEM circuitry 208 may also include a transmit signal path which may include circuitry configured to amplify signals for transmission provided by the RF circuitry 206 for transmission by one or more of the one or more antennas 210.

In some embodiments, the FEM circuitry 208 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 206). The transmit signal path of the FEM circuitry 208 may include a power amplifier (PA) to amplify input RF signals (e.g., provided by RF circuitry 206), and one or more filters to generate RF signals for subsequent transmission (e.g., by one or more of the one or more antennas 210.

In some embodiments, the UE 200 may include additional elements such as, for example, memory/storage, display, camera, sensor, and/or input/output (I/O) interface as described in more detail below. In some embodiments, the UE 200 described herein may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, the UE 200 may include one or more user interfaces designed to enable user interaction with the system and/or peripheral component interfaces designed to enable peripheral component interaction with the system. For example, the UE 200 may include one or more of a keyboard, a keypad, a touchpad, a display, a sensor, a non-volatile memory port, a universal serial bus (USB) port, an audio jack, a power supply interface, one or more antennas, a graphics processor, an application processor, a speaker, a microphone, and other I/O components. The display may be an LCD or LED screen including a touch screen. The sensor may include a gyro sensor, an accelerometer, a proximity sensor, an ambient light sensor, and a positioning unit. The positioning unit may communicate with components of a positioning network, e.g., a global positioning system (GPS) satellite.

The antennas 210 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 210 may be effectively separated to take advantage of spatial diversity and the different channel characteristics that may result.

Although the UE 200 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

Figure 3:
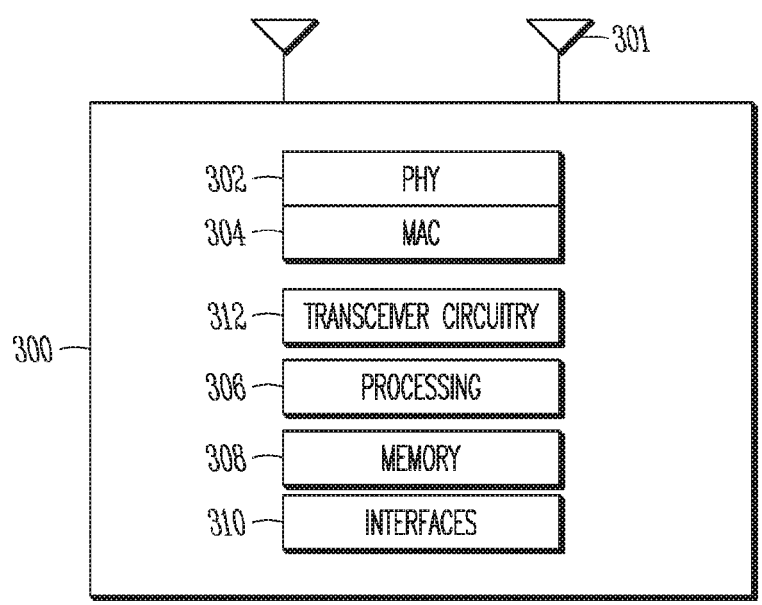
FIG. 3 illustrates a block diagram of a communication device in accordance with some embodiments.

FIG. 3 is a block diagram of a communication device in accordance with some embodiments. The device may be a UE or eNB, for example, such as the UE 102 or eNB 104 shown in FIG. 1 that may be configured to track the UE as described herein. The physical layer circuitry 302 may perform various encoding and decoding functions that may include formation of baseband signals for transmission and decoding of received signals. The communication device 300 may also include medium access control layer (MAC) circuitry 304 for controlling access to the wireless medium. The communication device 300 may also include processing circuitry 306, such as one or more single-core or multi-core processors, and memory 308 arranged to perform the operations described herein. The physical layer circuitry 302, MAC circuitry 304 and processing circuitry 306 may handle various radio control functions that enable communication with one or more radio networks compatible with one or more radio technologies. The radio control functions may include signal modulation, encoding, decoding, radio frequency shifting, etc. For example, similar to the device shown in FIG. 2, in some embodiments, communication may be enabled with one or more of a WMAN, a WLAN, and a WPAN. In some embodiments, the communication device 300 can be configured to operate in accordance with 3GPP standards or other protocols or standards, including WiMax, WiFi, GSM, EDGE, GERAN, UMTS, UTRAN, or other 3G, 3G, 4G, 5G, etc. technologies either already developed or to be developed. The communication device 300 may include transceiver circuitry 312 to enable communication with other external devices wirelessly and interfaces 314 to enable wired communication with other external devices. As another example, the transceiver circuitry 312 may perform various transmission and reception functions such as conversion of signals between a baseband range and a Radio Frequency (RF) range.

The antennas 301 may comprise one or more directional or omnidirectional antennas, including, for example, dipole antennas, monopole antennas, patch antennas, loop antennas, microstrip antennas or other types of antennas suitable for transmission of RF signals. In some MIMO embodiments, the antennas 301 may be effectively separated to take advantage of spatial diversity and the different channel characteristics that may result.

Although the communication device 300 is illustrated as having several separate functional elements, one or more of the functional elements may be combined and may be implemented by combinations of software-configured elements, such as processing elements including DSPs, and/or other hardware elements. For example, some elements may comprise one or more microprocessors, DSPs, FPGAs, ASICs, RFICs and combinations of various hardware and logic circuitry for performing at least the functions described herein. In some embodiments, the functional elements may refer to one or more processes operating on one or more processing elements. Embodiments may be implemented in one or a combination of hardware, firmware and software. Embodiments may also be implemented as instructions stored on a computer-readable storage device, which may be read and executed by at least one processor to perform the operations described herein.

Figure 4:
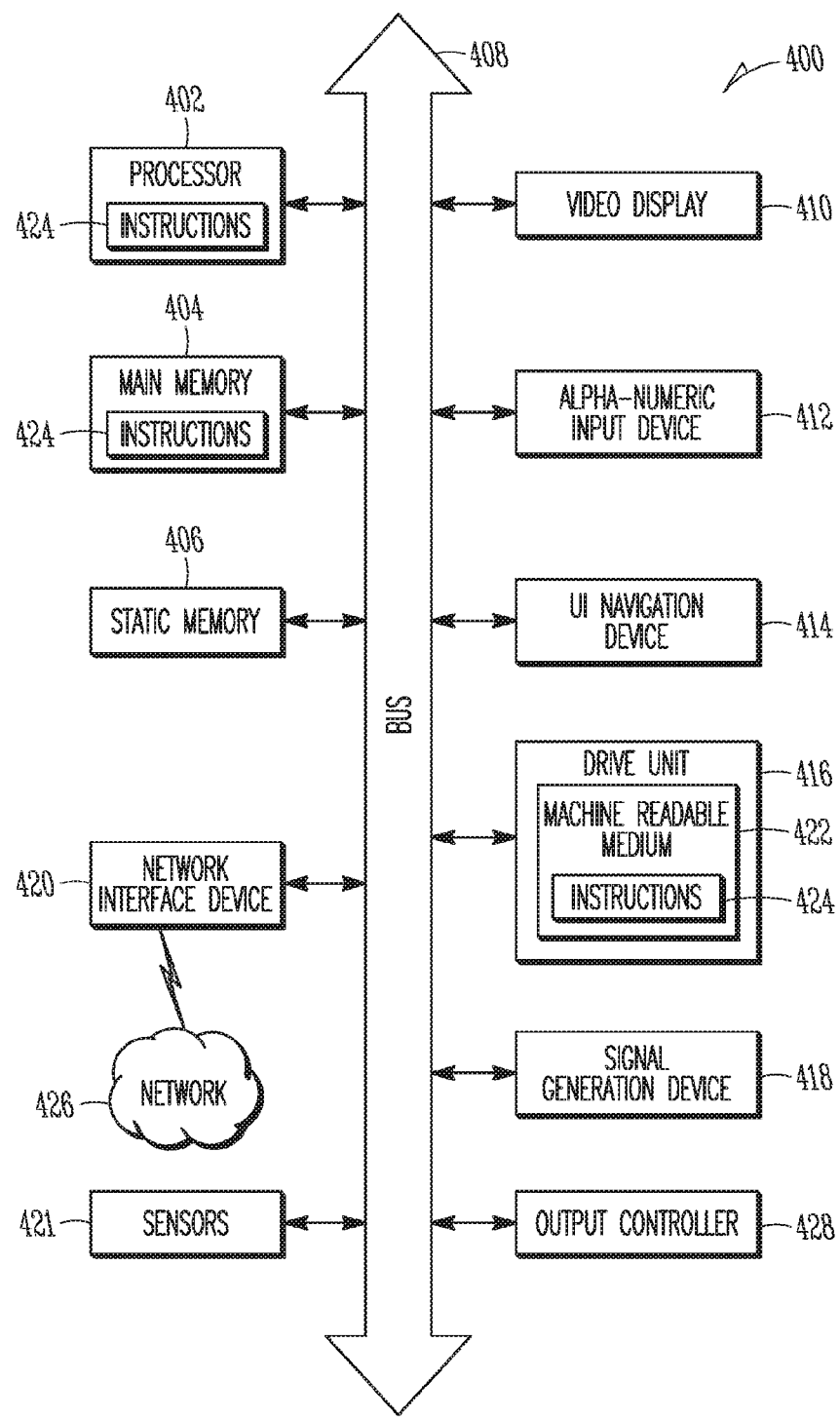
FIG. 4 illustrates another block diagram of a communication device in accordance with some embodiments.

FIG. 4 illustrates another block diagram of a communication device in accordance with some embodiments. In alternative embodiments, the communication device 400 may operate as a standalone device or may be connected (e.g., networked) to other communication devices. In a networked deployment, the communication device 400 may operate in the capacity of a server communication device, a client communication device, or both in server-client network environments. In an example, the communication device 400 may act as a peer communication device in peer-to-peer (P2P) (or other distributed) network environment. The communication device 400 may be a UE, eNB, PC, a tablet PC, a STB, a PDA, a mobile telephone, a smart phone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a communication device readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Communication device (e.g., computer system) 400 may include a hardware processor 402 (e.g., a central processing unit (CPU), a graphics processing unit (GPU), a hardware processor core, or any combination thereof), a main memory 404 and a static memory 406, some or all of which may communicate with each other via an interlink (e.g., bus) 408. The communication device 400 may further include a display unit 410, an alphanumeric input device 412 (e.g., a keyboard), and a user interface (UI) navigation device 414 (e.g., a mouse). In an example, the display unit 410, input device 412 and UI navigation device 414 may be a touch screen display. The communication device 400 may additionally include a storage device (e.g., drive unit) 416, a signal generation device 418 (e.g., a speaker), a network interface device 420, and one or more sensors 421, such as a global positioning system (GPS) sensor, compass, accelerometer, or other sensor. The communication device 400 may include an output controller 428, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 416 may include a communication device readable medium 422 on which is stored one or more sets of data structures or instructions 424 (e.g., software) embodying or utilized by any one or more of the techniques or functions described herein. The instructions 424 may also reside, completely or at least partially, within the main memory 404, within static memory 406, or within the hardware processor 402 during execution thereof by the communication device 400. In an example, one or any combination of the hardware processor 402, the main memory 404, the static memory 406, or the storage device 416 may constitute communication device readable media.

While the communication device readable medium 422 is illustrated as a single medium, the term "communication device readable medium" may include a single medium or multiple media (e.g., a centralized or distributed database, and/or associated caches and servers) configured to store the one or more instructions 424.

The term "communication device readable medium" may include any medium that is capable of storing, encoding, or carrying instructions for execution by the communication device 400 and that cause the communication device 400 to perform any one or more of the techniques of the present disclosure, or that is capable of storing, encoding or carrying data structures used by or associated with such instructions. Non-limiting communication device readable medium examples may include solid-state memories, and optical and magnetic media. Specific examples of communication device readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device readable media may include non-transitory communication device readable media. In some examples, communication device readable media may include communication device readable media that is not a transitory propagating signal.

The instructions 424 may further be transmitted or received over a communications network 426 using a transmission medium via the network interface device 420 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 420 may include one or more physical jacks (e.g., Ethernet, coaxial, or phone jacks) or one or more antennas to connect to the communications network 426. In an example, the network interface device 420 may include a plurality of antennas to wirelessly communicate using at least one of single-input multiple-output (SIMO), MIMO, or multiple-input single-output (MISO) techniques. In some examples, the network interface device 420 may wirelessly communicate using Multiple User MIMO techniques. The term "transmission medium" shall be taken to include any intangible medium that is capable of storing, encoding or carrying instructions for execution by the communication device 400, and includes digital or analog communications signals or other intangible medium to facilitate communication of such software.

As discussed above, it may be desirable to redesign control signals for the upcoming 5G systems due to the use of mm transmission wavelengths and consequently enhanced use of beamforming. Among these, the frame structure and location of HARQ ACK/NACK signals may be beneficially adjusted to achieve good interference cancelation and mitigation performance. In particular, a symmetric downlink and uplink HARQ ACK/NACK design may be beneficial to simplify receiver implementation, especially when considering device to device (D2D) communication. Control and data channels for 5G system can be multiplexed in a time-division multiplexing (TDM) or frequency-division multiplexing (FDM) manner. In some embodiments, the ACK/NACK control channel can be multiplexed in the TDM fashion with other control channels and data channel.

As above, for downlink transmission ACK/NACK feedback may be carried in the PUCCH while for uplink transmission ACK/NACK feedback may be carried in the PHICH. Depending on the size of aggregated ACK/NACK bits, different PUCCH formats can be used. PUCCH resources have been located at the edges of the overall available spectrum and span 1 subframe. To provide frequency diversity, the frequency resource may be frequency hopped on the slot boundary. Note that this PUCCH structure may not be appropriate for TDM based multiplexing schemes for control and data channel, and also may not be preferable when considering the support of low latency applications.

As above, PHICHs may be located in the first OFDM symbol of each subframe of an FDD frame structure using a normal PHICH duration. A PHICH may be carried by several REGs. A PHICH group of multiple PHICHs that share the same set of REGs may be differentiated by orthogonal covers. Consequently, a specific PHICH is identified by two parameters: the PHICH group number and the orthogonal sequence index within the group. The channel coding for HARQ ACK/NACKs may use 3-bit repetition. PHICHs may use BPSK or QPSK modulation, so 3 modulation symbols may be generated for each ACK or NACK. The modulation symbols may be multiplied by the orthogonal cover, which has the spreading factor (SF) of 4 for a normal cyclic prefix, resulting in a total of 12 symbols. Each REG may contain 4 REs and each RE can carry one modulation symbol, so 3 REGs may be used for a single PHICH.

The PUCCH, on the other hand, may consist of 1 RB/transmission at one end of the system bandwidth, followed by another RB in the following slot (at opposite end of the channel spectrum), making use of frequency diversity. A PUCCH Control Region comprises every two such RBs. PUCCH formats are summarized in Table 1 below.

TABLE 1

| Format | 1 | 1a | 1b | 2 | 2a | 2b | 3 |
|---|---|---|---|---|---|---|---|
| UCI type | SR | A/N 1 bit | A/N 2 bit | CSI | CSI & A/N 1 bit | CSI & A/N 2 bits | A/N & SR for CA |
| Payload size (bit) | 1 | 1 | 2 | Up to 11 | Up to 11 | Up to 11 | Up to 21 |
| MCS | BPSK + spreading | BPSK + spreading | QPSK + spreading | RM (20, x) QPSK | RM (20, x) QPSK | RM (20, x) QPSK | RM(32, x) & rate matching, QPSK |

In PUCCH format 1a/1b, 3 symbols are used as DMRS, 4 symbols are used for data with either BPSK or QPSK with coherent detection. The UE 104 may detect the DMRS sequence, use the DMRS sequence for channel estimation, and then perform data detection. Since there are only 3 DMRS symbols, the multiplexing capability may be limited by the DMRS. In some embodiments, the DL and UL ACK/NACK channel design may be independent and use omnidirectional transmission without consideration of beamforming. Frequency diversity may improve link robustness, and the use of a symmetric DL/UL ACK/NACK transmission may provide for easier future extension of D2D communication and convergence of access and backhaul. Further, the ACK/NACK channel design may take into consideration the use of beamforming, which may be employed to compensate a large path loss due to use of mm Wave transmissions.

In some embodiments, a unified DL/UL ACK/NACK channel design may be provided when the same physical structure is used for the ACK/NACK channel. Note that in some embodiments the PDSCH and UL ACK/NACK may not be received by the UE at the same time. In some embodiments, the ACK/NACK channel may be time-division multiplexed with other control and data channels. For DL ACK/NACK transmissions, both analog and digital precoding can be used. The analog precoding weights may follow the PUSCH analog weight at the eNB 104 and the UE 102. The digital precoding weights may be calculated using the channel estimate estimated from the UL DMRS. For UL ACK/NACK transmissions, the analog precoding weight may be the same as the corresponding DL PDSCH. The digital precoding weights can be calculated using the channel estimated from the DL DMRS.

The unified DL/UL ACK/NACK channel design may employ a spreading code and non-coherent detection of the ACK/NACK may be used. The DL/UL ACK/NACK channel may be beamformed, using the same analog beamforming for the corresponding PDSCH and PUSCH transmission. This may provide a >20 dB gain in the mmWave transmissions. The beamforming weight of the ACK/NACK channel may be dynamically shaped following the data traffic which the ACK/NACK transmission is acknowledging. The UL ACK/NACK channel may be separated from the SR as the Tx/Rx may be fixed based on the HARQ timing. Therefore, beamforming can be performed by following the previous data transmission.

Figure 5:
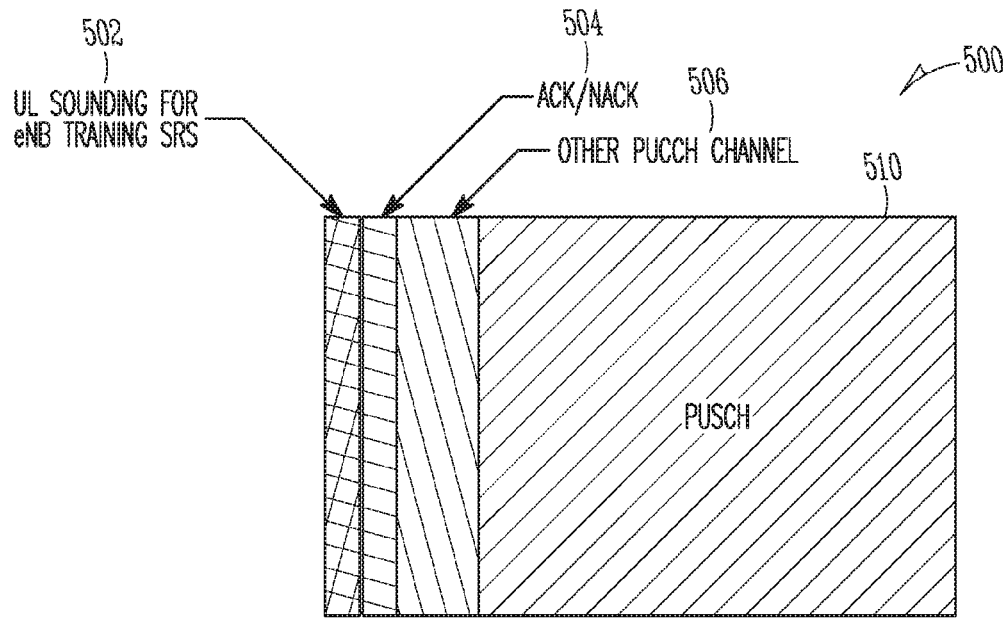
FIG. 5 illustrates a multiplexed uplink ACK/NACK channel in accordance with some embodiments.

FIG. 5 illustrates a multiplexed uplink ACK/NACK channel in accordance with some embodiments. The UL transmission 500 may include control information and data. The data may be provided in a PUSCH 510. The control information may include a SRS 502 and an ACK/NACK 504 multiplexed with control information in the PUCCH 506. Although not shown, the PUCCH 506 may include a scheduling request, CSI report, etc. The ACK/NACK 504 occurs after the SRS 502, thereby increasing the SINR of the ACK/NACK 504 by permitting beamforming to occur prior to reception of the ACK/NACK 504. In some embodiments, the UE Tx analog beam direction may be set based on the corresponding DL data traffic received; the eNB Rx analog beam direction may also be set using the same analog direction of the corresponding Tx direction in the DL data traffic.

Figure 6:
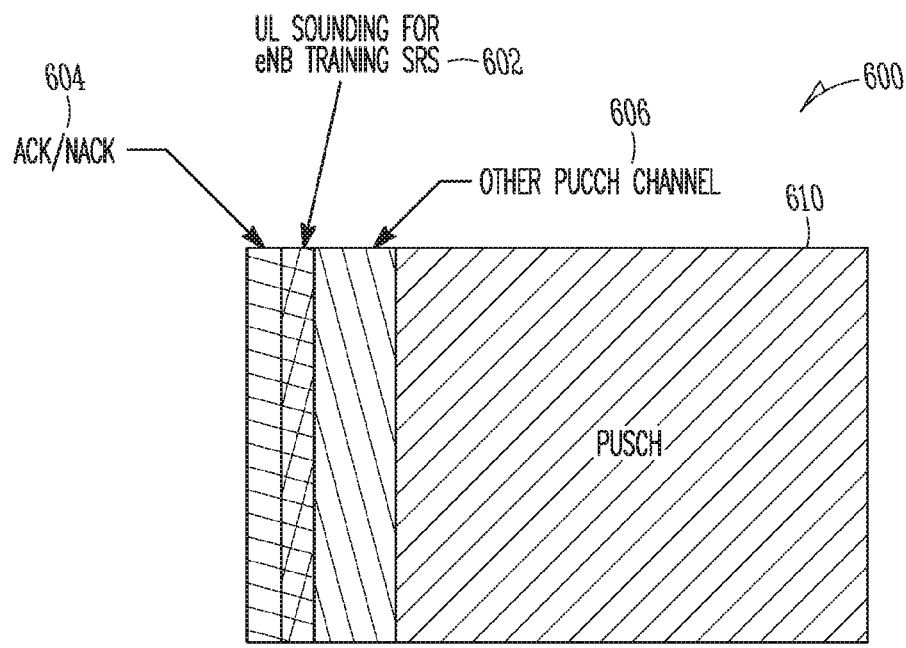
FIG. 6 illustrates another multiplexed uplink ACK/NACK channel in accordance with some embodiments.

FIG. 6 illustrates another multiplexed uplink ACK/NACK channel in accordance with some embodiments. The UL transmission 600 may include control information and data. The data may be provided in a PUSCH 610. The control information may include a SRS 602 and an ACK/NACK 604 multiplexed with control information in the PUCCH 606. In this embodiment, unlike the embodiment of FIG. 5, the position of the SRS 602 and ACK/NAK 604 may be switched. This is to say that the ACK/NACK 604 occurs prior to the SRS 602 in the first symbol of the UL Transmission Time Interval (TTI), thereby reducing the latency of the ACK/NACK 604 by permitting the ACK/NACK 604 to be received earlier. The TTI is the smallest unit of time in which the eNB is capable of scheduling the UE for uplink or downlink transmission.

In some embodiments, one or both of the SRS 502, 602 and ACK/NACK 504, 604 may be provided after the PUSCH 510, 610 at the end of the UL TTI instead of being provided at beginning of the UL TTI as shown in FIGS. 5 and 6. In some embodiments, one or both of the SRS 502, 602 and ACK/NACK 504, 604 may be provided prior to and adjacent to the PUSCH 510, 610. The ACK/NACK resource 504, 604 may be used to transmit PUSCH signal when no ACK/NACK is used at the allocated resource blocks when the ACK/NACK 504, 604 is adjacent to the PUSCH 510, 610. In this case, a single bit toggle may be added in the UL grant in which one of the values, say value 0, may indicate that the PUSCH 510, 610 is not mapped to the ACK/NACK symbols 504, 604 and the other value, say value 1, may indicate that the PUSCH 510, 610 is mapped to the ACK/NACK symbols 504, 604. The meaning of the values may be predetermined in the standard or may be set by higher layer signaling. Similarly, in other embodiments, the ACK/NACK resource 504, 604 may be merged with the PUCCH 506, 606, with an indicator being provided in the UL grant. This is to say that the ACK/NACK resource 504, 604 may be transmitted together with other uplink control information, e.g., a CSI report in another PUCCH format. Note that although the PUSCH and DL ACK/NACK are shown in FIGS. 5 and 6 as being transmitted in the same subframe, if UE does not have a UL grant from the eNB, the UE may transmit the DL HARQ ACK/NACK but may not transmit the PUSCH.

Figure 7:
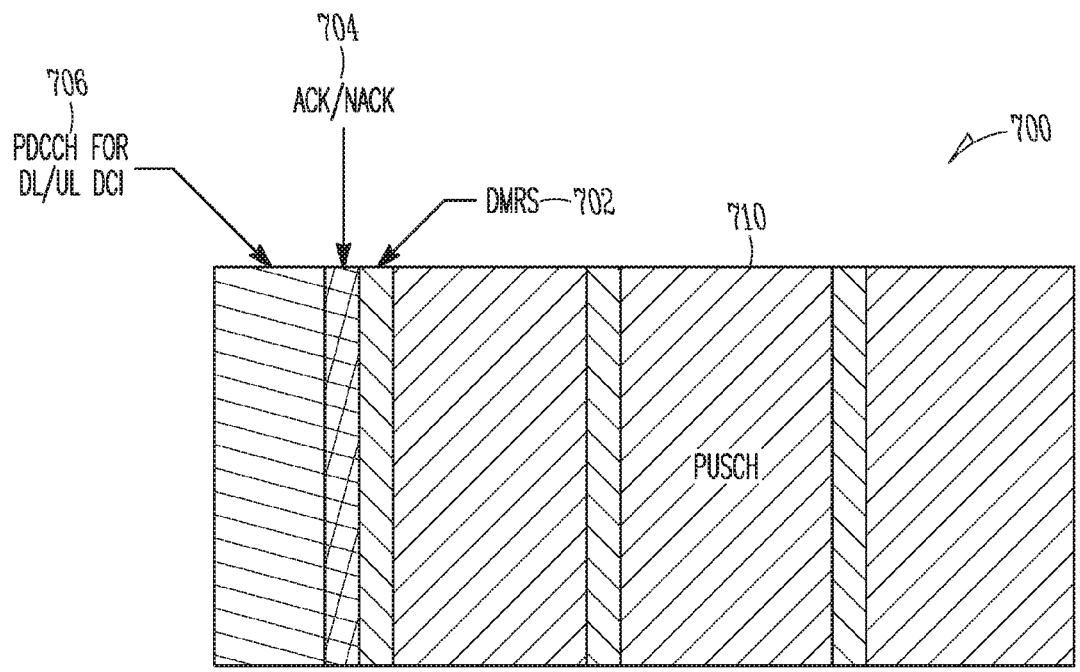
FIG. 7 illustrates a multiplexed downlink ACK/NACK channel in accordance with some embodiments.

FIG. 7 illustrates a multiplexed downlink ACK/NACK channel in accordance with some embodiments. The DL transmission 700 may include control information and data. The data may be provided in a PDSCH 710. The control information may include DMRS symbols 702 and an ACK/NACK 704 multiplexed with control information in the PDCCH 706. The eNB analog transmission weight of ACK/NACK 704 may be set to be the same as the receiving beam direction of the corresponding UL traffic (e.g., that shown in FIG. 5 or 6). The UE receiving analog direction of the ACK/NACK channel 500 may be set to be the same as the UL data traffic Tx direction. The eNB may apply digital precoding as well, using the channel estimated from UL DMRS 702. The application of analog and digital precoding may be transparent to the UE. Note that although the PDSCH and UL ACK/NACK are shown in FIG. 7 as being transmitted in the same subframe, in some embodiments, the PDSCH and UL ACK/NACK may not be transmitted at the same time.

As shown, in FIG. 7, the ACK/NACK 704 may occur prior to and adjacent to the DMRS 702. The ACK/NACK 704 may also occur after the PDCCH 706. In some embodiments, the ACK/NACK 704 may occur between the DMRS 702 and the PDSCH 710.

Figure 8:
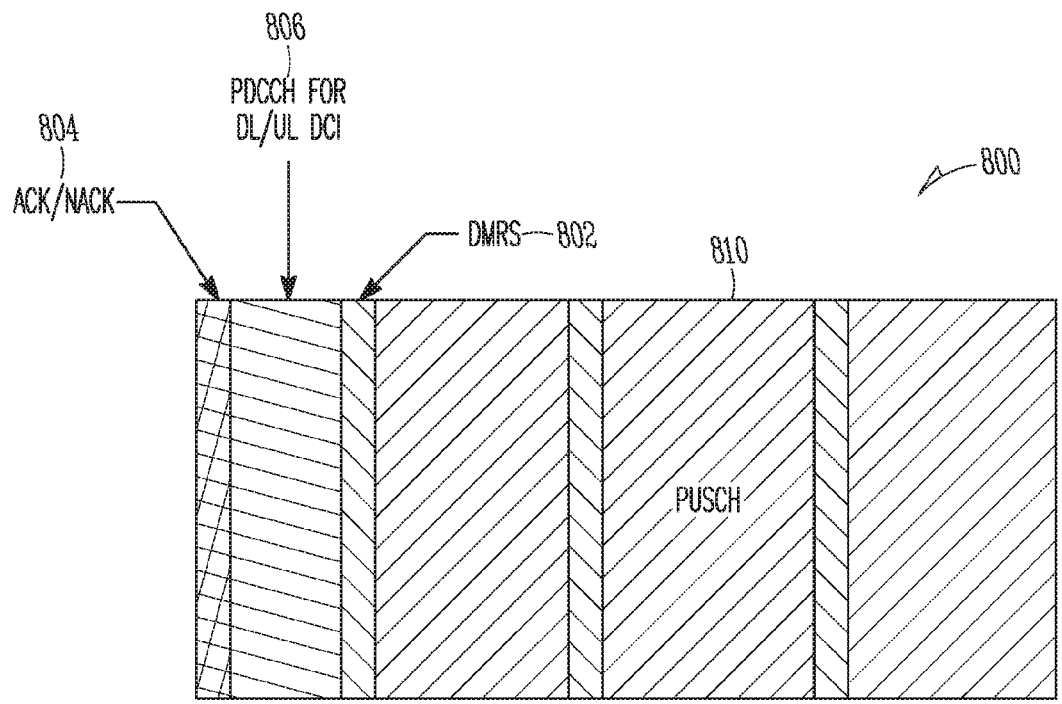
FIG. 8 illustrates another multiplexed downlink ACK/NACK channel in accordance with some embodiments.

FIG. 8 illustrates a multiplexed downlink ACK/NACK channel in accordance with some embodiments. The DL transmission 800 may include control information and data. The data may be provided in a PDSCH 810. The control information may include DMRS symbols 802 and an ACK/

NACK 804 multiplexed with control information in the PDCCH 806. The eNB analog transmission weight of ACK/NACK 804 may be set to be the same as the receiving beam direction of the corresponding UL traffic. The UE receiving analog direction of the ACK/NACK channel 500 may be set to be the same as the UL data traffic Tx direction. The eNB may apply digital precoding as well, using the channel estimated from UL DMRS 802. The application of analog and digital precoding may be transparent to the UE. As shown, in FIG. 8, the ACK/NACK 804 may occur prior to the DMRS 802 and the PDCCH 806. The ACK/NACK 804 may also occur after the PDCCH 806.

Similar to the above, when ACK/NACK feedback is not used, the ACK/NACK resource 704, 804 may be used to transmit the PDSCH 710, 810 or a reference signal. Whether the ACK/NACK resource 704, 804 transmits an ACK/NACK symbol or another signal may be configured via RRC signaling. A single bit toggle may be added in the DL assignment in which one of the values, say value 0, may indicate that the PDSCH 710, 810 is not mapped to the ACK/NACK symbol 704, 804 and the other value, say value 1, may indicate that the PDSCH 710 is mapped to the ACK/NACK symbol 704, 804. The meaning of the values may be predetermined in the standard or may be set by higher layer signaling. The downlink ACK/NACK resource 704, 804 may be merged with the PDCCH 706, 806, with an indicator being provided in the DL allocation.

Figure 9:
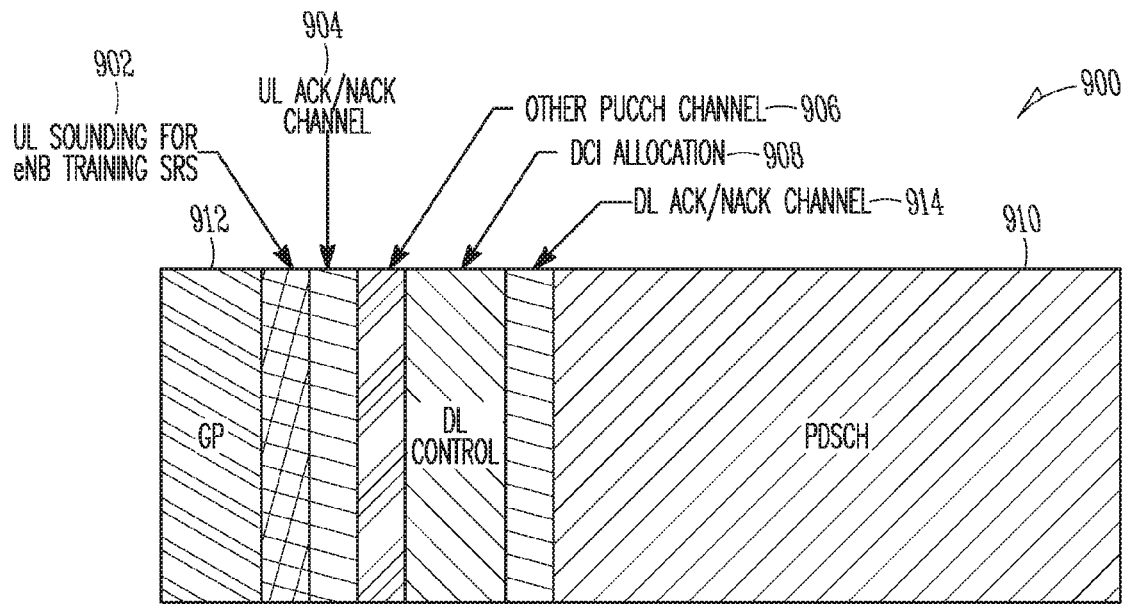
FIG. 9 illustrates a Time Division Duplexing (TDD) special subframe in accordance with some embodiments.

FIG. 9 illustrates a TDD special subframe in accordance with some embodiments. The special subframe 900, which may be preceded by a DL subframe, may include both a UL and DL control region. As shown, the UL control region is allocated in the DL TTI in the special subframe 900. A guard period 912 may be reserved at the initiation of the special subframe 900 to permit the UE to switch from the receiver chain to the transmitter chain. The UL control region may include a SRS 902 for beamforming training of the eNB, an UL ACK/NACK 904, and a PUCCH 906 similar to FIG. 5. The special subframe 900 may further include DL control signals including a DCI allocation 908 and a DL ACK/NACK 914 targeted for the same UE and/or a different UE than that of the UL ACK/NACK 904, and DL data in a PDSCH 910.

As shown, in FIG. 9, the UL ACK/NACK 904 may occur between the SRS 902 and the PDCCH 906 while the DL ACK/NACK 914 may between the DCI allocation 908 and the PDSCH 910. The UL ACK/NACK 904 in the UL control region may occur at or near the beginning of the special subframe 900 to enable low latency communication in DL heavy traffic. In other embodiments, the position of the UL/DL ACK/NACK 904 may switch with the SRS 902 or DCI allocation 908.

Figure 10:
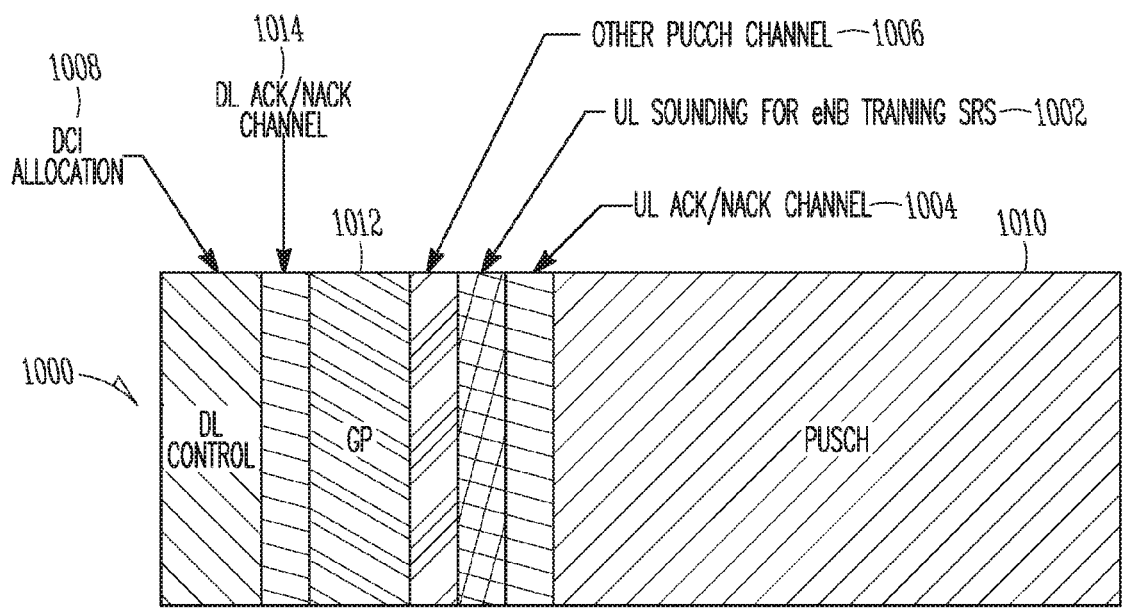
FIG. 10 illustrates another TDD special subframe in accordance with some embodiments.

FIG. 10 illustrates another TDD special subframe in accordance with some embodiments. Similar to FIG. 9, the special subframe 1000, which may be preceded by a UL subframe, may include both a UL and DL control region. In FIG. 10, however, the DL control region is allocated in the UL TTI in the special subframe 1000. The special subframe 1000 may start with the DL control region, which may include DL control signals including a DCI allocation 1008 and a DL ACK/NACK 1014 targeted for the same UE and/or a different UE than that of the UL ACK/NACK 1004. A guard period 1012 may be reserved between the DL ACK/NACK 1014 and the UL control region, which starts, as shown, with a PUCCH 1006. The UL control region may further include a SRS 1002 for beamforming training of the eNB and an UL ACK/NACK 1004, where the UL ACK/NACK 1004 may be adjacent to a PUSCH 1010.

As shown, in FIG. 10, the UL ACK/NACK 1004 may occur between the SRS 1002 and the PDCCH 1006 while the DL ACK/NACK 1014 may between the DCI allocation 1008 and the PDSCH 1010. The UL ACK/NACK 1004 in the UL control region may occur at or near the beginning of the special subframe 1000 to enable low latency communication in DL heavy traffic. In other embodiments, the position of the UL/DL ACK/NACK 1004 may switch with the SRS 1002 or DCI allocation 1008.

The physical structure of the ACK/NACK in any of the embodiments shown in FIGS. 5-10 may have various coding and spreading options to accommodate beamforming. The link budget of the ACK/NACK channel may be stricter than data channel transmission to ensure reliability. Typically, in LTE DL PHICH, an equivalent coding rate of $1/12$ may be used. In the UL PUCCH, the sequence length for the DMRS may thus be 12×3=36 samples long. In the ACK/NACK channel design herein, the beamforming gain may be similar to that of the data traffic. This means that the spreading code of the ACK/NACK channel may ensure the more reliable receiving of the ACK/NACK channel. Due to the analog beamforming weight constraint, the minimum granularity of the ACK/NACK channel may be one symbol.

In one example, for a 500 MHz bandwidth and 750 KHz subcarrier spacing in DL transmissions, there are total of 600 subcarriers in one symbol. This may provide a sufficient spreading gain for ACK/NACK transmission. A careful calculation of the link budget may be desirable for UL ACK/NACK transmission due to lower UE transmission power available. In one example, a typical small cell may have a 30 dBm Tx power while a UE has 20 dBm Tx power. When the DL scheduling contains more than 4 UEs, the DL and UL power may be balanced as the total UL Tx power from all the UEs may be greater than 30 dBm. The worst case link budget occurs when the PDSCH only transmits to one UE. In this case, the UL ACK/NACK spreading gain should be much higher than 10 dB. Since the UL uses one symbol to transmit ACK/NACK, the spreading gain is 10*log 10(600)=27 dB to meet the UL link budget.

Turning to ACK/NACK detection, non-coherent detection is used for the ACK/NACK channel design in some embodiments. The number of ACK/NACK bits may be limited due to the mmWave analog beamforming limitation. For single-carrier (SC) waveforms, supporting of coherent detection uses at least one symbol for DMRS and one symbol for data. To support non-coherent detection, two sequences may be used for one ACK/NACK bit. The assignment of the ACK/NACK sequence to corresponding bit is for further study. The sequence may be a ZC sequence or selected from other random orthogonal sequences.

To maintain sequence orthogonality in a frequency selective channel, the entire band may be divided into different subbands. A number of options may be available to multiplex the ACK/NACK channel for multiple UEs to achieve robust detection or decoding performance for ACK/NACK feedback. These options include time-division multiplexing (TDM), frequency-division multiplexing (FDM) and code-division multiplexing (CDM), as well as a combination of these. In some embodiments, a combination of frequency-division multiplexing (FDM) and code-division multiplexing (CDM) may be used in which UEs are subject to FDM on different subbands and CDM within each subband. In some embodiments, CDM may be used in which sequences are repeated in different subbands for a larger amount of frequency diversity. In some embodiments, the ACK/NACK transmission for different UEs may be separated using orthogonal sequences, a pseudo-random sequence or spreading codes.

Figure 11:
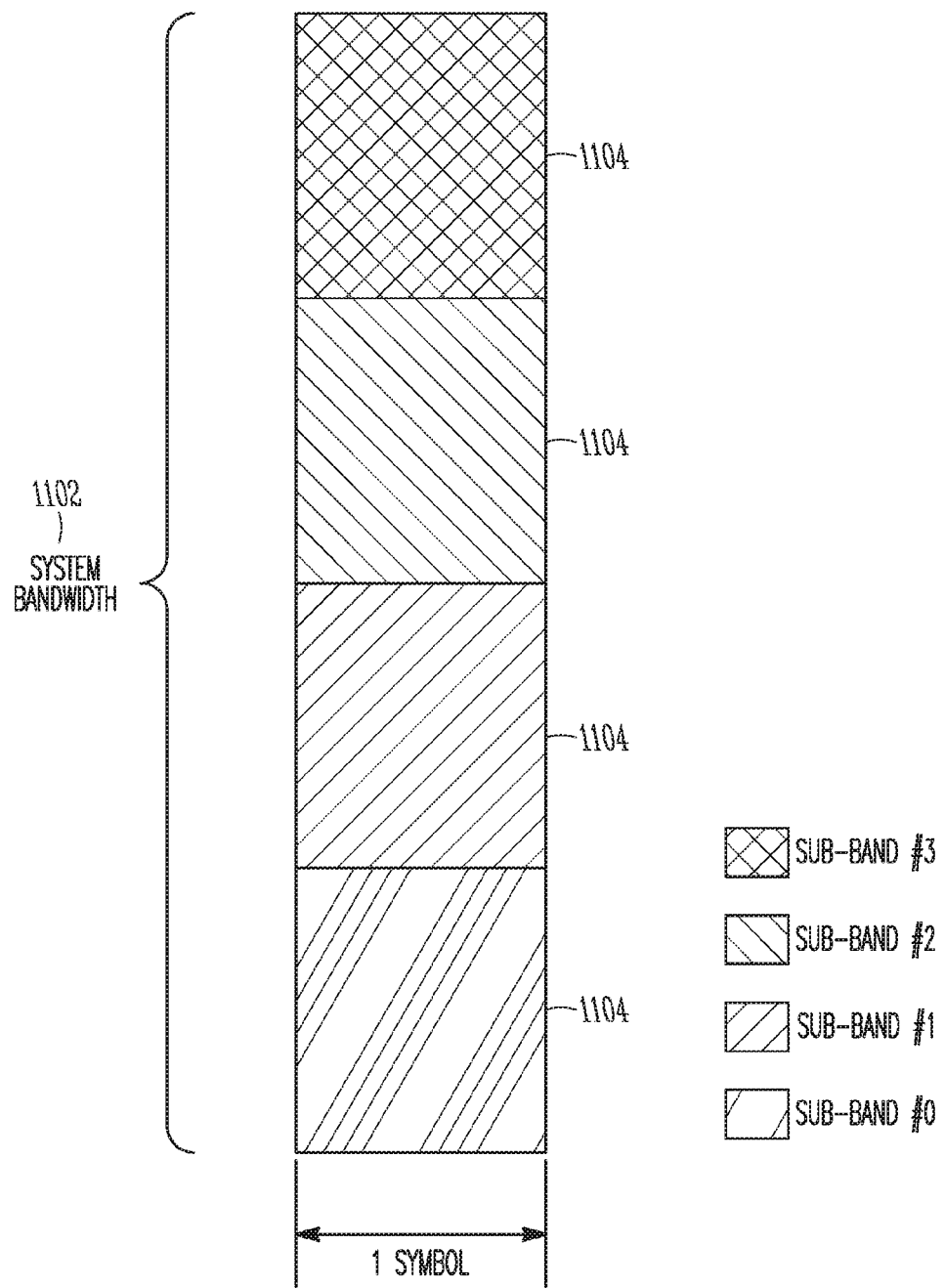
FIG. 11 illustrates a localized ACK/NACK transmission scheme in accordance with some embodiments.

Either a localized or distributed transmission scheme may be used for the ACK/NACK transmission. FIG. 11 illustrates a localized ACK/NACK transmission scheme in accordance with some embodiments. The channel design shown in FIG. 11 may be employed when a SC-FDMA or GI-DFT-s-OFDM waveform is used for the uplink ACK/NACK transmission. As shown in FIG. 11, a localized resource mapping scheme for the ACK/NACK transmission may have a system bandwidth 1102 divided into L subbands 1104, with each subband 1104 comprising K subcarriers, i.e., $$L=\lceil N_{sc}/K \rceil \text{ or } L=\lfloor N_{sc}/K \rfloor,$$

where $N_{sc}$ is the total number of subcarriers within system bandwidth 1102.

In the example shown in FIG. 11, the system bandwidth 1102 is divided into 4 adjacent subbands (L=4) 1104. Other values of the subband size and the number of subbands within the system bandwidth may be used, however. To minimize the implementation cost and specification impact, the subband size may be fixed. In different embodiments, the number of subbands can be different for different system bandwidths or the number of subbands may be fixed and independent of the system bandwidth.

Figure 12:
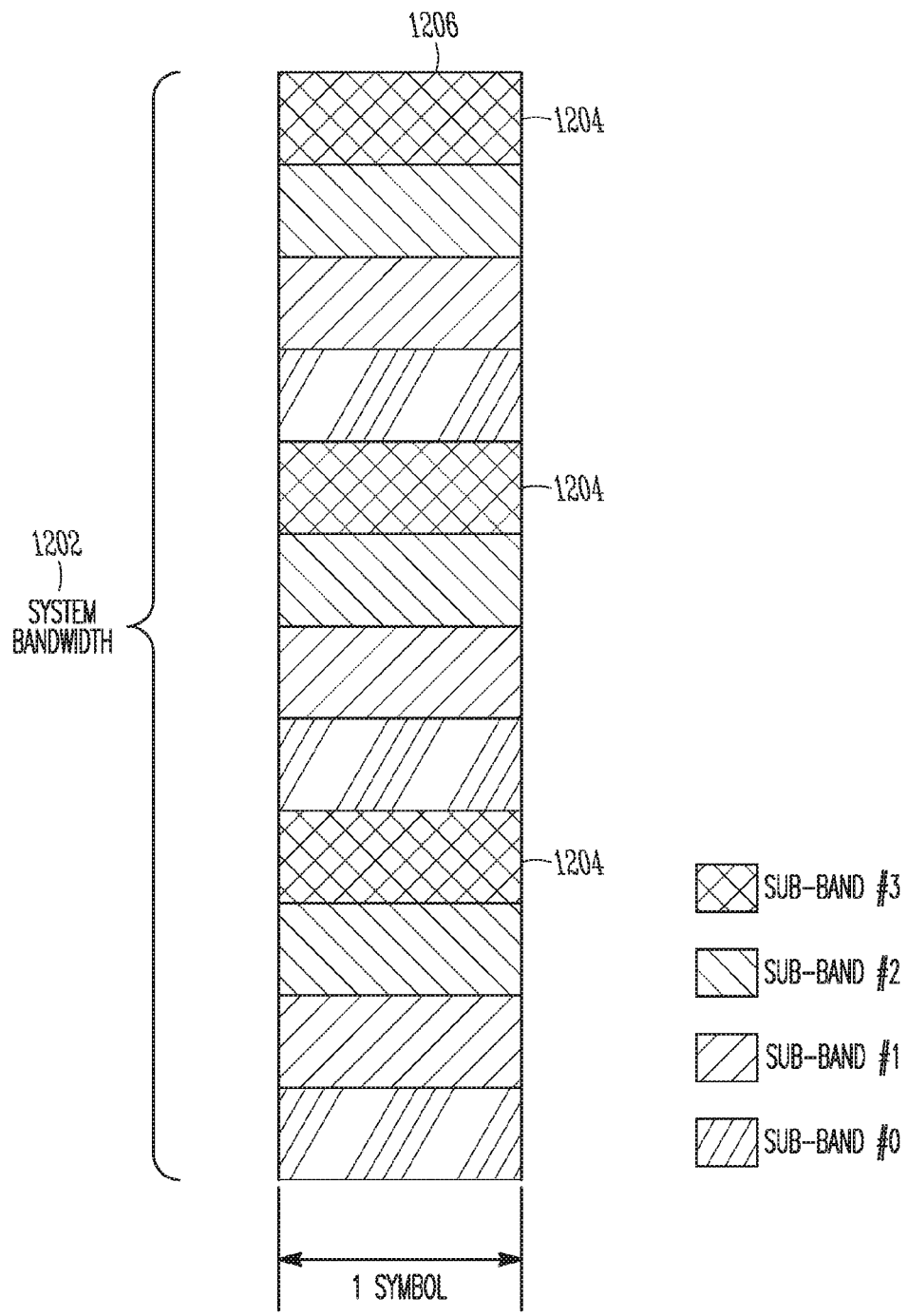
FIG. 12 illustrates a distributed ACK/NACK transmission scheme in accordance with some embodiments.

FIG. 12 illustrates a distributed ACK/NACK transmission scheme in accordance with some embodiments. The channel design shown in FIG. 12 may be employed when an OFDMA waveform is used for the uplink ACK/NACK transmission. As shown in FIG. 12, a resource mapping scheme for the ACK/NACK transmission may have a system bandwidth 1202 divided into L subbands 1204, with each subband 1204 comprising M subcarrier blocks 1206 and each subcarrier block 1206 occupying N subcarriers. The number of subbands can be calculated as:

$$L=\lceil N_{sc}/(MN) \rceil \text{ or } L=\lfloor N_{sc}/(MN) \rfloor$$

where $N_{sc}$ is the total number of subcarriers within system bandwidth 1102.

In the example shown in FIG. 12, similar to FIG. 11, the system bandwidth 1202 is divided into 4 subbands 1204 (L=4). As shown, each subband 1204 occupies 3 subcarrier blocks 1206 (M=3). Unlike the embodiment shown in FIG. 11, in which the subbands 1104 may be adjacent, In FIG. 12, the subcarrier blocks 1206 of different subbands 1204 may be adjacent. In some embodiments, the frequency separation between subcarrier blocks 1206 of the same subband 1204 may be the same for each subband 1204. In some embodiments, the frequency separation between subcarrier blocks of the same subband may differ, dependent on the subband, may not be uniform within the same subband and/or may not be uniformly distributed throughout the system bandwidth. For example, the frequency separation between subcarrier blocks of one subband may be adjacent to each other (i.e., not separated by one or more subcarrier blocks of one or more other subbands), other subcarrier blocks may be separated by one or more subcarrier blocks of one or more other subbands (and these other subbands may have different numbers of subcarrier blocks and/or frequency separations among the subcarrier blocks). Other values of subband size and number of subbands within the system bandwidth may be used.

Either sequence-based or channel-based ACK/NACK channel design with modulated symbols may be used. Non-coherent detection may be implemented when a sequence-based ACK/NACK channel design is used to minimize the receiver complexity. Reference symbols may be inserted within each subband or subcarrier block, or within an adjacent symbol when a channel-based ACK/NACK channel design is used to allow proper channel estimation and coherent detection.

For sequence based ACK/NACK design, in some embodiments, the ACK and NACK response may be transmitted in two independent ACK/NACK resources for each UE. As mentioned above, the resource for the ACK/NACK transmission can be defined as a dedicated frequency resource or a dedicated sequence or a combination thereof. In one example, ACK/NACK transmission resource #1 can be defined as subband #1 and sequence #1, while ACK/NACK transmission resource #2 can be defined as subband #2 and sequence #1. In another example, ACK/NACK transmission resource #1 can be defined as subband #1 and sequence #1, while ACK/NACK transmission resource #2 can be defined as subband #1 and sequence #2.

In some embodiments, only an ACK may be transmitted in the corresponding resource; a NACK is not transmitted. In this case, the receiver may assume a NACK if no response is received.

At the transmitter, an ACK or NACK response may be transmitted via a dedicated sequence within one subband. The sequence can be based on a ZC sequence, an M-sequence or a Hadamard sequence, for example, or other sequences which satisfy a Constant Amplitude Zero Autocorrelation (CAZAC) property. The following ACK/NACK channel designs are based on using a ZC sequence, however, similar design principles may be used for other sequences.

The sequence used for the ACK/NACK channel can be generated as follows:

$$r(n)=\exp(j\alpha n)\cdot\bar{r}_{u,v}(n)$$

where $\bar{r}_{u,v}(n)$ is the base sequence for the transmission of xTRS; u is the sequence-group number, v is the sequence number; α is the cyclic shift.

Note that u and v can be determined as a function of physical cell identity, a virtual cell identity or slot/subframe/frame index. The virtual cell ID may be configured by higher layers. In one example, u and v can be generated according to Release 13 of the LTE specification, wherein u is defined in section 5.5.1.3 and v is defined in 3GPP Technical Specification 36.211, section 5.5.1.4. Similarly, base sequence $\bar{r}_{u,v}(n)$ can be generated as defined in 3GPP TS 36.211, section 5.5.1. As defined, a ZC sequence may be used when the length is no less than 36 while computer generated sequences are used for 1 or 2 PRB allocations.

In another example, the sequence used for the ACK/NACK channel can be generated by puncturing or cyclic extension of the ZC sequence. The length of the ZC sequence is defined as $N_{ZC}$ and the subband size as K. $N_{ZC}$ in some embodiments may be a prime number. In one example, $N_{ZC}$ can be defined as the largest prime number such that $N_{ZC}<K$ or the smallest prime number such that $N_{ZC} \geq K$.

In the case when the ZC sequence length is less than the subband size, i.e., $N_{ZC}<K$, the base sequence can be generated by either puncturing or a cyclic extension of the ZC sequence. In one option, the base sequence can be given by a cyclic extension of the ZC sequence $x_u(n)$:

$$\bar{r}_{u,v}(n)=x_q(n \bmod N_{ZC}), 0 \leq n < K$$

In another embodiment, the base sequence can be given by puncturing certain subcarrier in the subband:

$$\bar{r}_{u,v}(n) = \begin{cases} x_q(n), & 0 \le n < N_{ZC} \\ 0, & \text{otherwise} \end{cases}$$

with the ZC sequence generated by:

$$x_q(m) = \exp\left(-\frac{j\pi qm(m+1)}{N_{ZC}}\right), \quad 0 \le m < N_{ZC}$$

In the case when the ZC sequence length is larger than the subband size, i.e., $N_{ZC} \ge K$, the base sequence can be generated by puncturing certain elements in the ZC sequence, $$\bar{r}_{u,v} = x_q(n), 0 \le n < K$$

In the above equations, the relationship between q and (u, v) can reuse the LTE specification as defined in 3GPP TS 36.211, section 5.5.1.1. Based on the above equations, multiple orthogonal sequences can be generated from a single base sequence through different values of the cyclic shift α.

Figure 13:
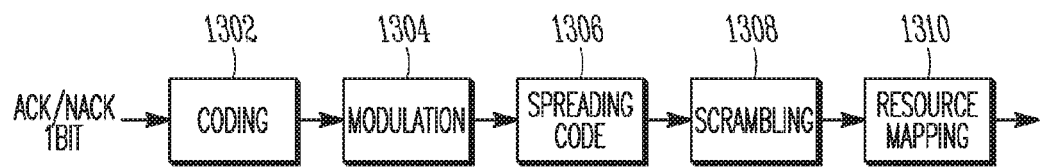
FIG. 13 illustrates generation of ACK/NACK channel in accordance with some embodiments.

FIG. 13 illustrates generation of ACK/NACK channel in accordance with some embodiments. In operation 1302, the ACK/NACK bit may be coded. This is to say that a repetition code of length Q can be applied to the 1 bit ACK/NACK. In some embodiments, bit "1" may be used to indicate an ACK while bit "0" may be used to indicate a NACK. Q may be a fixed value for all UEs or may have a UE-specific configuration. In an example of Q value selection, Q may be smaller for UEs with a higher SINR and have a larger value for UEs with a lower SINR. The Q length selection may be configured via dedicated RRC signaling or in a DCI. In another example, the Q value may be implicitly indicated by the CCE aggregation level or Modulation and Coding Scheme (MCS).

At operation 1304, after being coded, modulation may be applied to the coded ACK/NACK bit. In some embodiments, BPSK or QPSK may be used for the modulation.

At operation 1306, a spreading code may be applied to the modulated symbol. As above, the spreading code may be a ZC code, a Hadamard code or an orthogonal code as defined in 3GPP TS 36.211, section 6.9.1.

Subsequently, at operation 1308 cell specific scrambling can be used to further randomize the interference after the spreading code has been applied. More specifically, a scrambling seed can be defined as a function of a physical cell ID, a virtual cell ID and/or subframe/slot/symbol index for the transmission of ACK/NACK. In one example, the scrambling seed can be given by:

$$c_{init} = \left(\left\lfloor\frac{n_s}{2}\right\rfloor + 1\right) \cdot (2N_{cell}^{ID} + 1) \cdot 2^9 + N_{cell}^{ID}$$

where $n_s$ is the slot index and $N_{cell}^{ID}$ is the cell ID.

After the ACK/NACK has been scrambled, the generated modulated symbols may be mapped to the appropriate resource at operation 1310. The resource mapping may be based on a predetermined resource mapping rule. In some embodiments, the resource mapping may start from the lowest frequency index within an allocated subband.

Figures 14A, 14B, 14C:
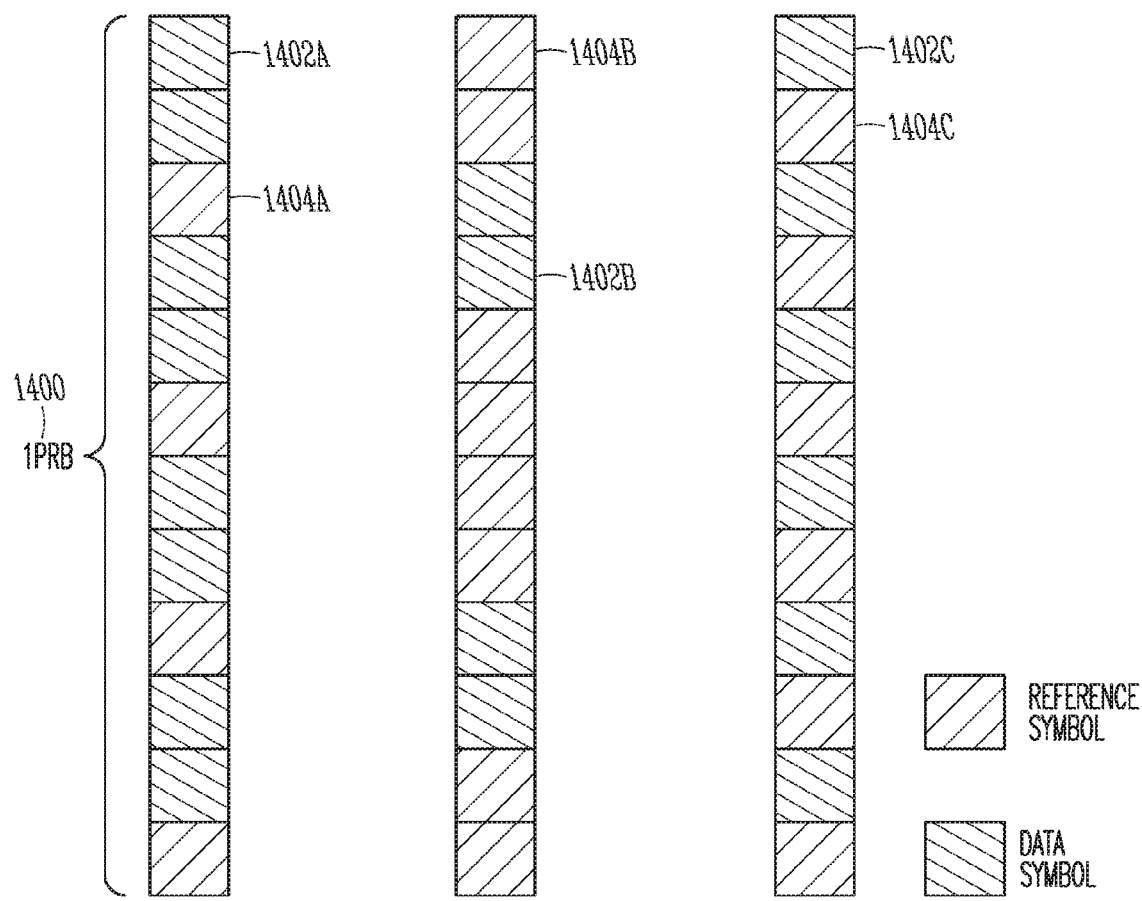
FIGS. 14A-14C illustrate various resource mappings in accordance with some embodiments.

FIGS. 14A-14C illustrate various resource mappings in accordance with some embodiments. Each of these figures illustrate resource mapping for 1 PRB 1400, which comprises 12 symbols. FIGS. 14A-14C show different mappings of data (ACK/NACK) symbols 1402A, 1402B, 1402C and reference symbols 1404A, 1404B, 1404C. In particular, in FIG. 14A, a larger number of data symbols 1402A may be present than reference symbols 1404A. The data symbols 1402A may be grouped together, as shown in pairs, and the groupings of data symbols 1402A separated by a single reference symbols 1404A. In some embodiments, each reference signal 1404A may shift by one or two symbols. In some embodiments, each reference signal 1404A may shift by one or two symbols.

In FIG. 14B, a larger number of reference symbols 1404A may be present than data symbols 1402A. The data symbols 1402B may be grouped together, as shown in pairs, and the groupings of data symbols 1402B separated by a group of reference symbols 1404B. Each group of reference symbols 1404B may contain the same number of reference symbols 1404B or, as shown, at least one group of reference symbols 1404B may have a different number of reference symbols 1404B.

In FIG. 14C, the same number of reference symbols 1404A may be present as data symbols 1402A. The data symbols 1402C and reference symbols 1404C may be interleaved. Adjacent data symbols 1402C are separated by a single reference symbol 1404C and adjacent reference symbols 1404C may be separated by a single data symbol 1402C.

In some embodiments, a reference symbol may be transmitted prior to the ACK/NACK channel. In this case, reference symbols may not be used in the symbol used for the ACK/NACK transmission. In this case, modulated ACK/NACK symbols can span the entire allocated subband.

The total number of resources depends on the spreading factor in each subband and total number of subbands allocated for ACK/NACK transmission. In one example, in a sequence-based ACK/NACK channel design, the system bandwidth can be divided into 5 subbands, with each subband consisting of 120 subcarriers. The spreading factor or the number of orthogonal sequences within each subband may be 12. The total number of resources for ACK/NACK transmissions may thus be 5*12=60. If an ACK and NACK are transmitted using independent resources, then the total capacity may be reduced to 30. In another example, for channel-based ACK/NACK design, if the spreading factor is 8, based on a Hadamard sequence, and the total number of subbands is 5, then the total number of resources for ACK/NACK transmissions can be 5*8=40.

The resource index for ACK/NACK transmission can be represented as a form of subband index ($I_{SB}$) and spreading code index ($I_{SF}$). For sequence based ACK/NACK channel design, the cyclic shift α can be considered as the spreading code index $I_{SF}$. Different embodiments may be used to determine the resource index ($I_{SB}$, $I_{SF}$) for each UE.

In some embodiments, the resource index for ACK/NACK transmission can be derived as a function of a cell-specific parameter and/or a UE-specific parameter. The cell specific parameter, which may be a physical cell ID or a virtual cell ID, can be configured by the MIB, SIB or dedicated RRC signaling. The UE-specific parameter can be configured from the primary cell or serving cell via dedicated RRC signaling.

In one example, the resource index can be given by:

$$(I_{SB}, I_{SF}) = f(I_{AN})$$

where $I_{AN}$ is the UE-specific ACK/NACK resource index, which may be provided by UE-dedicated RRC signaling. For instance, the resource index for the transmission of ACK/NACK can be calculated as:

$$\begin{cases} I_{SB} = \lfloor I_{AN}/K \rfloor \\ I_{SF} = (I_{AN}) \bmod(K) \end{cases} \quad (1)$$

In another example, the resource index can be given by:

$$(I_{SB}, I_{SF}) = f(I_{AN}, N_{cell}^{ID})$$

where $N_{cell}^{ID}$ is the cell ID. For instance, the resource index can be calculated as:

$$\begin{cases} I_{SB} = \lfloor (I_{AN} + N_{cell}^{ID})/K \rfloor \\ I_{SF} = (I_{AN} + N_{cell}^{ID}) \bmod(K) \end{cases}$$

In some embodiments, the resource index for ACK/NACK transmission can be derived as a function of a cell-specific parameter, a UE-specific parameter and/or a parameter explicitly signaled in the DCI format. The parameter signaled in the DCI format for uplink grant or downlink assignment can include the subband index used for ACK/NACK transmission and/or the DM-RS used for the PDSCH or PUSCH transmission. When a DCI-signaled parameter is used, determination of the ACK/NACK transmission can follow equation (1), where $I_{AN}$ is the parameter signaled in the DCI format for uplink grant or downlink assignment. For adaptive retransmission users, the latest transmitted ACK/NACK resource index in the same HARQ process may be used.

In another example, for sequence based ACK/NACK channel design, the subband index $I_{SB}$ can be explicitly signalled in the DCI format, while cyclic shift $\alpha$ can be derived based on:

$$\alpha_{ACK} = (K_0 + N_{cell}^{ID} + n_{DM-RS}) \bmod(N_{SF})$$

where $K_0$ is the starting cyclic shift offset, $n_{DM-RS}$ is the DM-RS sequence index used for PDSCH or PUSCH transmission, $N_{SF}$ is a constant, e.g., $N_{SF}$=12. $K_0$ can be pre-defined or configured by higher layer signaling via MIB, SIB or dedicated UE-specific RRC signaling.

In another example, for both sequence-based and channel-based ACK/NACK designs, the resource index can be given by:

$$\begin{cases} I_{SB} = (I_{AN} + n_{DM-RS}) \bmod(K) \\ I_{SF} = \left( \left\lfloor \dfrac{I_{AN}}{K} \right\rfloor + n_{DM-RS} \right) \bmod(c_0 \cdot N_{SF}) \end{cases} \quad (2)$$

where $c_0$ is a constant.

In some embodiments, the resource index for ACK/NACK transmission can be derived as a function of beamforming index, subframe/symbol/slot index and/or PRB index used for the PDSCH or PUSCH transmission. In addition, various combinations of the above parameters can be used to determine the resource index for the transmission of ACK/NACK. In one example, the resource index for ACK/NACK transmission can be given by:

$$\begin{cases} I_{SB} = (I_{sym} + n_{DM-RS}) \bmod(K) \\ I_{SF} = \left( \left\lfloor \dfrac{I_{sym}}{K} \right\rfloor + n_{DM-RS} \right) \bmod(c_0 \cdot N_{SF}) \end{cases} \quad (3)$$

where $I_{sym}$ is the starting symbol index used for the transmission of PDSCH or PUSCH.

In another example, the resource index for ACK/NACK transmission can be given by:

$$\begin{cases} I_{SB} = (I_{PRB} + n_{DM-RS}) \bmod(K) \\ I_{SF} = \left( \left\lfloor \dfrac{I_{PRB}}{K} \right\rfloor + n_{DM-RS} \right) \bmod(c_0 \cdot N_{SF}) \end{cases} \quad (4)$$

where $I_{PRB}$ is the starting PRB index used for the transmission of PDSCH or PUSCH.

In the above equations, for sequence-based ACK/NACK design, if an independent resource is used for each ACK and NACK transmission, the resource used for the transmission of NACK can be a constant shift from the resource used for the transmission of ACK. The same design principle can be applied for the case for the ACK/NACK feedback of the $2^{nd}$ transport block. The constant can predefined or configured by higher layer via MIB, SIB or dedicated UE-specific RRC signaling.

In one example, for the ACK/NACK feedback of the $2^{nd}$ transport block, the resource index can be given by:

$$\begin{cases} I_{SB} = \lfloor (I_{AN} + N_{cell}^{ID} + \Delta)/K \rfloor \\ I_{SF} = (I_{AN} + N_{cell}^{ID} + \Delta) \bmod(K) \end{cases}$$

where $\Delta$ is a constant,

In another example, the resource index can be given by:

$$\begin{cases} I_{SB} = (I_{AN} + n_{DM-RS} + \Delta) \bmod(K) \\ I_{SF} = \left( \left\lfloor \dfrac{I_{AN} + \Delta}{K} \right\rfloor + n_{DM-RS} \right) \bmod(c_0 \cdot N_{SF}) \end{cases}$$

When an independent resource is used for the transmission of NACK, in one example, the cyclic shift can be given by:

$$\alpha_{NACK} = (K_0 + N_{cell}^{ID} + n_{DM-RS} + \Delta) \bmod(N_{SF})$$

Example 1 is an apparatus of user equipment (UE) comprising: a transceiver arranged to communicate with an evolved NodeB (eNB); and processing circuitry arranged to: configure the transceiver to receive from the eNB a physical downlink shared channel (PDSCH) associated with the UE and an uplink (UL) Hybrid Automatic Repeat Request Acknowledgement/Negative-acknowledgement (HARQ ACK/NACK); determine a resource for a downlink (DL) HARQ ACK/NACK in response to the PDSCH; and configure the transceiver to transmit to the eNB the DL HARQ ACK/NACK that the UL HARQ ACK/NACK and DL HARQ ACK/NACK are symmetric.

In Example 2, the subject matter of Example 1 optionally include that the UL HARQ ACK/NACK is transmitted in a UL HARQ ACK/NACK channel in which UL HARQ ACK/NACKs for multiple UEs are multiplexed in at least one of a time-division multiplexing (TDM), frequency-division multiplexing (FDM) and code-division multiplexing (CDM) manner, which is downconverted to baseband by mixer circuitry prior to the resource being determined.

In Example 3, the subject matter of Example 2 optionally include that the UL HARQ ACK/NACK channel uses a localized transmission scheme in which a system bandwidth is divided into a plurality of subbands, and each subband comprises a UL HARQ ACK/NACK for a different UE and comprises a plurality of subcarriers.

In Example 4, the subject matter of any one or more of Examples 2-3 optionally include that the UL HARQ ACK/NACK channel uses a distributed transmission scheme in which a system bandwidth is divided into a plurality of subbands, each subband comprises a UL HARQ ACK/NACK for a different UE and is divided into a plurality of subcarrier blocks, each subcarrier block of a particular subband occupies a plurality of subcarriers and is separated from another subcarrier block of the particular subband by a subcarrier block of another subband.

In Example 5, the subject matter of any one or more of Examples 2-4 optionally include that the UL HARQ ACK/NACK channel uses a transmission scheme in which a system bandwidth is divided into a plurality of subbands, and each subband comprises a UL HARQ ACK/NACK for a different UE and uses a dedicated sequence selected from one of a Zadoff-Chu (ZC) sequence, a M-sequence, a Hadamard sequence and a sequence that satisfies a Constant Amplitude Zero Autocorrelation (CAZAC) property.

In Example 6, the subject matter of Example 5 optionally include that the UL HARQ ACK/NACK of the UE comprises a separate ACK and NACK response that use independent resources.

In Example 7, the subject matter of any one or more of Examples 5-6 optionally include that the UL HARQ ACK/NACK of the UE comprises a single resource for both an ACK response and a NACK response, and the processing circuitry is arranged to determine that a NACK response is indicated by the lack of an ACK response in the single resource.

In Example 8, the subject matter of any one or more of Examples 5-7 optionally include that the sequence comprises a ZC sequence comprising a base sequence determined as a function of at least one of physical cell identity, virtual cell identity, a slot index of the UL HARQ ACK/NACK, a subframe index of the UL HARQ ACK/NACK and a frame index of the UL HARQ ACK/NACK.

In Example 9, the subject matter of any one or more of Examples 1-8 optionally include that a repetition code of a predetermined length is applied to an ACK/NACK bit to form a repeated bit, the repeated bit is modulated using one of binary phase shift keying (BPSK) and quadrature PSK (QPSK) to form a modulated symbol, a spreading code is applied to the modulated symbol to form a spread symbol, cell-specific scrambling is applied to the spread symbol to form a scrambled symbol, a scrambling seed of the cell-specific scrambling is defined as a function of at least one of physical cell identity, a virtual cell identity, a slot index of the UL HARQ ACK/NACK, a subframe index of the UL HARQ ACK/NACK and a frame index of the UL HARQ ACK/NACK, and the scrambled signal is mapped starting from a lowest frequency index within an allocated subband to form a modulated ACK/NACK symbol of the UL HARQ ACK/NACK.

In Example 10, the subject matter of any one or more of Examples 1-9 optionally include that an ACK/NACK resource of the UL HARQ ACK/NACK is determined using a function of subband index (I_SB) and spreading code index (I_SF) used for the UL HARQ ACK/NACK, a resource index for the UL HARQ ACK/NACK is a function of at least one of a cell-specific parameter, a UE-specific parameter, a parameter signaled in a DCI format, and, as used for one of the PDSCH and a physical uplink shared channel (PUSCH), at least one of: a beamforming index, a slot index, a subframe index, a frame index and a physical resource block index, and the cell-specific parameter is configured by master information block (MIB), system information block (SIB) or dedicated RRC signaling, the UE-specific parameter is configured from one of a primary cell and a serving cell via dedicated RRC signaling, and the parameter signaled in the DCI format is one of the subband index and a Demodulation Reference Signal (DM-RS) used for the one of the PDSCH and PUSCH.

In Example 11, the subject matter of any one or more of Examples 1-10 optionally include that at least one of: the DL HARQ ACK/NACK is time-division multiplexed with a physical uplink control channel (PUCCH) and transmitted in a beamformed DL HARQ ACK/NACK channel, and the UL HARQ ACK/NACK is time-division multiplexed with a physical downlink control channel (PDCCH) and received in a beamformed UL HARQ ACK/NACK channel.

In Example 12, the subject matter of Example 11 optionally include that at least one of: a beamforming weight of the DL HARQ ACK/NACK channel is dynamically shaped to follow beamforming of the PDSCH such that a transmit analog beam direction of the DL HARQ ACK/NACK channel is based on the PDSCH, and a beamforming weight of the UL HARQ ACK/NACK channel is dynamically shaped to follow beamforming of a previous PUSCH such that a transmit analog beam direction of the UL HARQ ACK/NACK channel is based on the previous PUSCH, and digital precoding of the UL HARQ ACK/NACK channel is based on a channel estimation obtained from a UL demodulation reference signal (DMRS) transmitted from the UE.

In Example 13, the subject matter of any one or more of Examples 11-12 optionally include that at least one of: for the DL HARQ ACK/NACK: a DL HARQ ACK/NACK symbol is a first symbol of an UL Transmission Time Interval (TTI), the DL HARQ ACK/NACK symbol is adjacent to the PUSCH, and a sounding reference signal (SRS) and the DL HARQ ACK/NACK channel are allocated at an end of the UL TTI after the PUSCH, and for the UL HARQ ACK/NACK: a UL HARQ ACK/NACK symbol is a first symbol of a DL TTI, the UL HARQ ACK/NACK symbol is adjacent to the PDSCH, and the UL HARQ ACK/NACK channel is disposed at an end of the DL TTI after the PDSCH.

In Example 14, the subject matter of Example 13 optionally include that at least one of: a physical downlink control channel (PDCCH) received by the UE comprises a UL grant to transmit the PUSCH and the UL grant comprises an indicator that indicates one of a plurality of values in which one value indicates that a DL HARQ ACK/NACK resource for DL HARQ ACK/NACK symbols is to be free from mapping of the PUSCH to the DL HARQ ACK/NACK resource and another value indicates the PUSCH is to be mapped to the DL HARQ ACK/NACK resource, and the PDCCH comprises a DL assignment that comprises an indicator that indicates one of a plurality of values in which one value indicates that a UL HARQ ACK/NACK resource for UL HARQ ACK/NACK symbols is free from mapping of the PDSCH to the UL HARQ ACK/NACK resource and another value indicates the PDSCH is mapped to the UL HARQ ACK/NACK resource.

In Example 15, the subject matter of any one or more of Examples 11-14 optionally include that the DL HARQ ACK/NACK and UL HARQ ACK/NACK are contained in a special subframe.

In Example 16, the subject matter of any one or more of Examples 1-15 optionally further comprise an antenna configured to provide communications between the transceiver and the eNB.

Example 17 is an apparatus of an evolved NodeB (eNB) comprising: a transceiver arranged to communicate with a plurality of user equipment (UEs); and processing circuitry arranged to: configure the transceiver to receive from each UE a physical uplink shared channel (PUSCH); at least one of time-division multiplex (TDM), frequency-division multiplex (FDM) and code-division multiplex (CDM) an uplink Hybrid Automatic Repeat Request Acknowledgement/Non-acknowledgement (UL HARQ ACK/NACK) for each UE in a UL HARQ ACK/NACK channel in response to the PUSCH; and configure the transceiver to transmit the UL HARQ ACK/NACK channel to the UEs.

In Example 18, the subject matter of Example 17 optionally include that the UL HARQ ACK/NACK channel uses a transmission scheme in which a system bandwidth is divided into a plurality of subbands and each subband comprises a UL HARQ ACK/NACK for a different UE and occupies a plurality of subcarriers, each subband uses a dedicated sequence selected from one of a Zadoff-Chu (ZC) sequence, a M-sequence, a Hadamard sequence and a sequence that satisfies a Constant Amplitude Zero Autocorrelation (CAZAC) property, the ZC sequence comprising a base sequence determined as a function of at least one of physical cell identity, a virtual cell identity, a slot index of the UL HARQ ACK/NACK, a subframe index of the UL HARQ ACK/NACK and a frame index of the UL HARQ ACK/NACK, and one of: a) the transmission scheme is a localized transmission scheme in which, for each subband, the subcarriers in the subband are adjacent to each other, and b) the transmission scheme is a distributed transmission scheme in which each subband is divided into a plurality of subcarrier blocks each of which is separated from another subcarrier block of the particular subband by a subcarrier block of another subband.

In Example 19, the subject matter of Example 18 optionally include that for at least one of the UEs one of: the UL HARQ ACK/NACK comprises a separate ACK and NACK response that uses independent resources, and the processing circuitry is arranged to: determine whether an ACK response in a resource of the UL HARQ ACK/NACK is to be transmitted by the transceiver, and in response to determining that the resource is to be free from the ACK response, transmitting the UL HARQ ACK/NACK channel to the UEs in which the resource is free from the ACK response to indicate to a NACK response to the PUSCH of the at least one of the UEs.

In Example 20, the subject matter of any one or more of Examples 17-19 optionally include that for at least one of the UEs the processing circuitry is further arranged to: apply a repetition code of a predetermined length to an ACK/NACK bit to form a repeated bit, modulate the repeated bit using one of binary phase shift keying (BPSK) and quadrature PSK (QPSK) to form a modulated symbol, spread the modulated symbol using a spreading code to form a spread symbol, scramble the spread symbol using cell-specific scrambling to form a scrambled symbol, a scrambling seed of the cell-specific scrambling is defined as a function of at least one of physical cell identity, a virtual cell identity, a slot index of the UL HARQ ACK/NACK, a subframe index of the UL HARQ ACK/NACK and a frame index of the UL HARQ ACK/NACK, and map the scrambled signal starting from a lowest frequency index within an allocated subband to form a modulated ACK/NACK symbol of the UL HARQ ACK/NACK.

In Example 21, the subject matter of any one or more of Examples 17-20 optionally include that for at least one of the UEs: the UL HARQ ACK/NACK is time-division multiplexed with a physical downlink control channel (PDCCH), and a beamforming weight of the UL HARQ ACK/NACK channel is dynamically shaped to follow beamforming of the previous PUSCH such that a transmit analog beam direction of the UL HARQ ACK/NACK channel is based on the previous PUSCH, and digital precoding of the UL HARQ ACK/NACK channel is based on a channel estimation obtained from a UL demodulation reference signal (DMRS) transmitted from the UE.

In Example 22, the subject matter of Example 21 optionally include that at least one of: a) one of: a UL HARQ ACK/NACK symbol is a first symbol of a DL Transmission Time Interval (TTI), the UL HARQ ACK/NACK symbol is adjacent to a physical downlink shared channel (PDSCH), and the UL HARQ ACK/NACK channel is disposed at an end of the DL TTI after the PDSCH, and b) the PDCCH comprises a DL assignment that comprises an indicator having a plurality of values in which one value indicates that a UL HARQ ACK/NACK resource for UL HARQ ACK/NACK symbols is to be free from mapping of the PDSCH to the UL HARQ ACK/NACK resource and another value indicates the PDSCH is to be mapped to the UL HARQ ACK/NACK resource.

Example 23 is a computer-readable storage medium that stores instructions for execution by one or more processors of user equipment (UE) to communicate with an evolved NodeB (eNB), the one or more processors to configure the UE to: receive from the eNB a physical downlink shared channel (PDSCH), an uplink Hybrid Automatic Repeat Request Acknowledgement/Non-acknowledgement (UL HARQ ACK/NACK) for the UE at least one of time-division multiplexed (TDM), frequency-division multiplexed (FDM) and code-division multiplexed (CDM) with a UL HARQ ACK/NACK for another UE in a UL HARQ ACK/NACK channel; determine a resource for a downlink (DL) HARQ ACK/NACK in response to the PDSCH; and transmit to the eNB the DL HARQ ACK/NACK in a DL HARQ ACK/NACK channel.

In Example 24, the subject matter of Example 23 optionally include that the DL HARQ ACK/NACK channel uses a transmission scheme in which a system bandwidth is divided into a plurality of subbands and each subband comprises a DL HARQ ACK/NACK for a different UE and occupies a plurality of subcarriers, the subband for the UE uses a dedicated sequence selected from one of a Zadoff-Chu (ZC) sequence, a M-sequence, a Hadamard sequence and a sequence that satisfies a Constant Amplitude Zero Autocorrelation (CAZAC) property, the ZC sequence comprising a base sequence determined as a function of at least one of physical cell identity, a virtual cell identity, a slot index of the DL HARQ ACK/NACK, a subframe index of the DL HARQ ACK/NACK and a frame index of the DL HARQ ACK/NACK, and one of: a) the transmission scheme is a localized transmission scheme in which, for each subband, the subcarriers in the subband are adjacent to each other, and b) the transmission scheme is a distributed transmission scheme in which each subband is divided into a plurality of subcarrier blocks each of which is separated from another subcarrier block of the particular subband by a subcarrier block of another subband.

In Example 25, the subject matter of any one or more of Examples 23-24 optionally include that the DL HARQ ACK/NACK comprises a separate ACK and NACK response that use independent resources, and the one or more processors further configure the UE to: determine whether an ACK response in a resource of the DL HARQ ACK/NACK is to be transmitted by the transceiver, and in response to determining that the resource is to be free from the ACK response, transmitting the DL HARQ ACK/NACK channel to the eNB in which the resource is free from the ACK response to indicate to a NACK response to the PDSCH.

In Example 26, the subject matter of any one or more of Examples 23-25 optionally include that the UL HARQ ACK/NACK is time-division multiplexed with a physical uplink control channel (PUCCH), and a beamforming weight of the DL HARQ ACK/NACK channel is dynamically shaped to follow beamforming of the PDSCH such that a transmit analog beam direction of the DL HARQ ACK/NACK channel is based on the PDSCH.

In Example 27, the subject matter of any one or more of Examples 23-26 optionally include that at least one of: a) one of: a DL HARQ ACK/NACK symbol is a first symbol of a UL Transmission Time Interval (TTI), the DL HARQ ACK/NACK symbol is adjacent to a physical uplink shared channel (PUSCH), and the DL HARQ ACK/NACK channel is allocated at an end of the UL TTI after the PDSCH, and b) a physical downlink control channel (PDCCH) received by the UE comprises a UL grant to transmit the PUSCH and the UL grant comprises an indicator that indicates one of a plurality of values in which one value indicates that a DL HARQ ACK/NACK resource for DL HARQ ACK/NACK symbols is to be free from mapping of the PUSCH to the DL HARQ ACK/NACK resource and another value indicates the PUSCH is to be mapped to the DL HARQ ACK/NACK resource.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus comprising: processing circuitry configured to cause a user equipment (UE) arranged to:
    decode, from an evolved NodeB (eNB) a physical downlink shared channel (PDSCH);
    in response to the PDSCH, generate a Hybrid Automatic Repeat Request Acknowledgement/Negative Acknowledgement (HARQ ACK/NACK), the HARQ ACK/NACK generated using:

$$r(n) = \exp(j\alpha n) \cdot \bar{r}_{u,v}(n)$$

where $\bar{r}_{u,v}(n)$ is a base sequence; u is a sequence group number, v is a sequence number and α is a cyclic shift that is different for an ACK than for a NACK, wherein the cyclic shift is determined from a function of an initial cyclic shift, a cell id, and a predetermined constant shift dependent on whether the UL HARQ ACK/NACK is a UL HARQ ACK or a UL HARQ NACK, and modulus-12 operation performed on the function; and
    encode the HARQ ACK/NACK for transmission to the eNB in a physical uplink control channel (PUCCH); and
    memory configured to store the HARQ ACK/NACK.

2. The apparatus of claim 1, wherein:
    the cyclic shift varies as a function of a symbol and slot number of the PUCCH.

3. The apparatus of claim 2, wherein:
    the sequence is a Zadoff-Chu (ZC) sequence, and
    the processing circuitry is further arranged to determine the base sequence as a function of a physical cell identity of the eNB.

4. The apparatus of claim 2, wherein:
    the sequence is a Zadoff-Chu (ZC) sequence, and
    the processing circuitry is further arranged to determine the base sequence as a function of a virtual cell identity of the eNB.

5. The apparatus of claim 2, wherein:
the sequence is a Zadoff-Chu (ZC) sequence, and
the processing circuitry is further arranged to determine the base sequence as a function of at least one of slot index of the PUCCH, a subframe index of the PUCCH, or a frame index of the PUCCH.

6. The apparatus of claim 1, wherein:
the processing circuitry is further arranged to decode, from the eNB, a physical downlink control channel (PDCCH) that comprises a UL grant to transmit the PUSCH, and
the UL grant comprises an indicator that indicates one of a plurality of values in which one value indicates that a HARQ ACK/NACK resource for HARQ ACK/NACK symbols is to be free from mapping of the PUSCH to the HARQ ACK/NACK resource and another value indicates the PUSCH is to be mapped to the HARQ ACK/NACK resource.

7. The apparatus of claim 1, wherein the processing circuitry is further arranged to:
apply a repetition code of a predetermined length to an ACK/NACK bit to form a repeated bit,
modulate the repeated bit using one of binary phase shift keying (BPSK) and quadrature PSK (QPSK) to form a modulated symbol,
apply a spreading code to the modulated symbol to form a spread symbol,
apply cell-specific scrambling to the spread symbol to form a scrambled symbol, a scrambling seed of the cell-specific scrambling defined as a function of at least one of a physical cell identity of the eNB, a virtual cell identity of the eNB, a slot index of the PUCCH, a subframe index of the PUCCH and a frame index of the PUCCH, and
map the scrambled signal starting from a lowest frequency index within an allocated subband to form a modulated ACK/NACK symbol of the HARQ ACK/NACK.

8. The apparatus of claim 1, wherein:
an ACK/NACK resource of the HARQ ACK/NACK is a function of subband index ($I_{SB}$) and spreading code index ($I_{SF}$) used for the HARQ ACK/NACK,
a resource index for the HARQ ACK/NACK is a function of at least one of a cell-specific parameter, a UE-specific parameter, a parameter signaled in a Downlink Control Information (DCI) format, and, as used for one of the PDSCH and a physical uplink shared channel (PUSCH), at least one of: a beamforming index, a slot index, a subframe index, a frame index and a physical resource block index, and
the cell-specific parameter is configured by master information block (MIB), system information block (SIB) or dedicated Radio Resource Control (RRC) signaling, the UE-specific parameter is configured from one of a primary cell and a serving cell via dedicated RRC signaling, and the parameter signaled in the DCI format is one of the sub band index and a Demodulation Reference Signal (DM-RS) used for the one of the PDSCH and PUSCH.

9. The apparatus of claim 1, wherein the processing circuitry is further arranged to:
time-division multiplex the HARQ ACK/NACK with a physical uplink control channel (PUCCH), the HARQ ACK/NACK transmitted in a beamformed HARQ ACK/NACK channel, and
dynamically shape a beamforming weight of the HARQ ACK/NACK channel to follow beamforming of a previous PUSCH such that a transmit analog beam direction of the HARQ ACK/NACK channel is based on the previous PUSCH, and digital precoding of the HARQ ACK/NACK channel is based on a channel estimation obtained from an UL Demodulation Reference Signal (DM-RS) transmitted from the UE.

10. The apparatus of claim 1, wherein:
the processing circuitry is further arranged to time-division multiplex the HARQ ACK/NACK with a physical uplink control channel (PUCCH), the HARQ ACK/NACK transmitted in a beamformed HARQ ACK/NACK channel, and
a HARQ ACK/NACK symbol is a first symbol of a DL Transmission Time Interval (TTI),
the HARQ ACK/NACK symbol is adjacent to the PDSCH,
the HARQ ACK/NACK channel is disposed at an end of the DL TTI after the PDSCH.

11. The apparatus of claim 1, wherein:
the sequence is a Zadoff-Chu (ZC) sequence ($x_u(n)$), and
the processing circuitry is further arranged to, if a ZC sequence length (Nzc) is less than a subband size (K), generate the base sequence using a cyclic extension for the ZC sequence:

$$\bar{r}_{u,v}(n) = x_q(n \bmod N_{ZC}), 0 \leq n \leq K.$$

12. The apparatus of claim 1, wherein:
the sequence is a Zadoff-Chu (ZC) sequence ($x_u, (n)$), and
the processing circuitry is further arranged to, if a ZC sequence length (Nzc) is less than a subband size (K), generate the base sequence by puncturing a carrier in the subband such that:

$$\bar{r}_{u,v}(n) = \begin{cases} x_q(n), & 0 \leq n < N_{ZC} \\ 0, & \text{otherwise} \end{cases}$$

with the ZC sequence:

$$x_q(m) = \exp\left(-\frac{j\pi q m(m+1)}{N_{ZC}}\right), \quad 0 \leq m < N_{ZC}.$$

13. The apparatus of claim 1, wherein:
the sequence is a Zadoff-Chu (ZC) sequence ($x_u(n)$), and
the processing circuitry is further arranged to, if a ZC sequence length (Nzc) is larger than a subband size (K), generate the base sequence by puncturing an element in the ZC sequence such that:

$$\bar{r}_{u,v}(n) = x_q(n), 0 \leq n \leq K.$$

14. The apparatus of claim 1, wherein the processing circuitry is further arranged to:
generate a scrambling seed, the scrambling seed using $n_s$ is a slot index of the HARQ ACK/NACK and $N_{cell}^{ID}$ is a cell identifier (ID) of the eNB:

$$c_{init} = \left(\left\lfloor \frac{n_s}{2} \right\rfloor + 1\right) \cdot (2N_{cell}^{ID} + 1) \cdot 2^9 + N_{cell}^{ID}$$

apply, using the scrambling seed, cell-specific scrambling to a symbol of the HARQ ACK/NACK to form a scrambled symbol prior to transmission of the HARQ ACK/NACK.

15. The apparatus of claim 1, wherein:
the processing circuitry is further arranged to decode, from the eNB, a HARQ ACK/NACK received in a channel in which HARQ ACK/NACKs for multiple UEs are multiplexed in at least one of a time-division multiplexing (TDM), frequency-division multiplexing (FDM) and code-division multiplexing (CDM) manner, which is downconverted to baseband by mixer circuitry prior to the resource being determined.

16. The apparatus of claim 1, wherein the initial cyclic shift is provided by higher layers via dedicated UE specific RRC signaling.

17. An apparatus of an evolved NodeB (eNB) comprising: processing circuitry arranged to:
encode, for transmission to a user equipment (UE), a physical downlink shared channel (PDSCH); and
decode, from the UE in response to transmission of the PDSCH, a Hybrid Automatic Repeat Request Acknowledgement/Negative Acknowledgement (HARQ ACK/NACK) in a physical uplink control channel (PUCCH), the HARQ ACK/NACK being:

$$r(n)=\exp(j\alpha n)\cdot \bar{r}_{u,v}(n)$$

where $\bar{r}_{u,v}(n)$ is a base sequence; u is a sequence group number, v is a sequence number and α is a cyclic shift that is different for an ACK than for a NACK, wherein the cyclic shift is determined from a function of an initial cyclic shift, a cell id, and a predetermined constant shift dependent on whether the UL HARQ ACK/NACK is a UL HARQ ACK or a UL HARQ NACK, and modulus-12 operation performed on the function; and
memory configured to store the HARQ ACK/NACK.

18. The apparatus of claim 17, wherein:
an ACK/NACK resource of the HARQ ACK/NACK is a function of subband index ($I_{SB}$) and spreading code index ($I_{SF}$) used for the HARQ ACK/NACK,
a resource index for the HARQ ACK/NACK is a function of at least one of a cell-specific parameter, a UE-specific parameter, a parameter signaled in a Downlink Control Information (DCI) format, and, as used for one of the PDSCH and a physical uplink shared channel (PUSCH), at least one of: a beamforming index, a slot index, a subframe index, a frame index and a physical resource block index, and
the cell-specific parameter is configured by master information block (MIB), system information block (SIB) or dedicated Radio Resource Control (RRC) signaling, the UE-specific parameter is configured from one of a primary cell and a serving cell via dedicated RRC signaling, and the parameter signaled in the DCI format is one of the subband index and a Demodulation Reference Signal (DM-RS) used for the one of the PDSCH and PUSCH.

19. An apparatus comprising:
a transceiver arranged to communicate with a base station; and
processing circuitry arranged to cause a user equipment (UE) to:
configure the transceiver to receive from the eNB a physical downlink shared channel (PDSCH) associated with the UE;
determine a resource for a downlink (DL) HARQ ACK/NACK in response to the PDSCH; and
configure the transceiver to transmit to the eNB the DL HARQ ACK/NACK, wherein the DL HARQ ACK/NACK uses a same base sequence but different cyclic shifts dependent on whether the UL HARQ ACK/NACK is a UL HARQ ACK or a UL HARQ NACK, wherein the cyclic shift is determined from a function of an initial cyclic shift, a cell id, and a predetermined constant shift dependent on whether the UL HARQ ACK/NACK is a UL HARQ ACK or a UL HARQ NACK, and modulus-12 operation performed on the function.

20. The apparatus of claim 19, wherein the initial cyclic shift is provided by higher layers via dedicated UE specific RRC signaling.

* * * * *

UNITED STATES PATENT AND TRADEMARK OFFICE
CERTIFICATE OF CORRECTION

PATENT NO. : 10,958,386 B2
APPLICATION NO. : 16/408223
DATED : March 23, 2021
INVENTOR(S) : Gang Xiong et al.

It is certified that error appears in the above-identified patent and that said Letters Patent is hereby corrected as shown below:

In the Claims

Column 32, Line 47, Claim 1, delete "UL HARQ" and substitute --HARQ--

Column 32, Line 48, Claim 1, delete "UL HARQ ACK or a UL HARQ" and substitute --HARQ ACK or a HARQ--

Column 35, Line 28, Claim 16, delete "UL HARQ" and substitute --HARQ--

Column 35, Line 29, Claim 16, delete "UL HARQ ACK or a UL HARQ" and substitute --HARQ ACK or a HARQ--

Column 36, Line 28, Claim 19, delete "the UL HARQ" and substitute --a UL HARQ--

Signed and Sealed this
Twenty-ninth Day of August, 2023

Katherine Kelly Vidal
*Director of the United States Patent and Trademark Office*